United States Patent
Shiiba et al.

(10) Patent No.: US 8,932,181 B2
(45) Date of Patent: Jan. 13, 2015

(54) CONTROL DEVICE OF VEHICLE DRIVE DEVICE

(75) Inventors: Kazuyuki Shiiba, Miyoshi (JP); Takeshi Kanayama, Toyota (JP); Taiyo Uejima, Toyota (JP); Daiki Sato, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/982,851

(22) PCT Filed: Feb. 2, 2011

(86) PCT No.: PCT/JP2011/052182
§ 371 (c)(1),
(2), (4) Date: Jul. 31, 2013

(87) PCT Pub. No.: WO2012/105015
PCT Pub. Date: Aug. 9, 2012

(65) Prior Publication Data
US 2013/0316871 A1    Nov. 28, 2013

(51) Int. Cl.
| | |
|---|---|
| H02P 17/00 | (2006.01) |
| B60W 10/08 | (2006.01) |
| B60W 10/115 | (2012.01) |
| B60W 20/00 | (2006.01) |
| B60K 6/365 | (2007.10) |
| B60K 6/445 | (2007.10) |
| B60W 10/10 | (2012.01) |
| B60W 30/184 | (2012.01) |

(52) U.S. Cl.
CPC .............. *B60W 10/08* (2013.01); *B60W 10/115* (2013.01); *B60W 20/00* (2013.01); *B60K 6/365* (2013.01); *B60K 6/445* (2013.01); *B60W 10/10* (2013.01); *B60W 20/30* (2013.01); *B60W 30/184* (2013.01); *B60W 2710/081* (2013.01); *B60W 2710/082* (2013.01); *B60W 2710/083* (2013.01); *B60W 2710/085* (2013.01); *B60W 2710/1005* (2013.01); *Y02T 10/6239* (2013.01)
USPC .......................................................... 477/15

(58) Field of Classification Search
USPC ..................... 477/3, 7, 15, 20, 107, 110, 901; 903/906, 930, 945
See application file for complete search history.

(56) References Cited

U.S. PATENT DOCUMENTS

| 5,944,630 A * | 8/1999 | Omote ............................... 477/5 |
| 6,482,125 B2 * | 11/2002 | Urasawa ......................... 477/107 |
| 8,579,761 B2 * | 11/2013 | Schneider et al. ............. 477/107 |
| 2008/0109142 A1 * | 5/2008 | Endo ................................ 701/54 |
| 2009/0062070 A1 * | 3/2009 | Tabata et al. .................. 477/109 |

FOREIGN PATENT DOCUMENTS

| JP | A-2005-313865 | 11/2005 |
| JP | A-2008-87649 | 4/2008 |

* cited by examiner

*Primary Examiner* — Justin Holmes
(74) *Attorney, Agent, or Firm* — Oliff PLC

(57) ABSTRACT

It is provided a control device of a vehicle drive device having an electric motor connected via an inverter to an electric-motor power source, an inverter smoothing capacitor connected to the inverter of the electric-motor power source side thereof, and a transmission making up a portion of a power transmission path between the electric motor and drive wheels, the control device being configured to make an output torque of the electric motor smaller as the rotation speed of the electric motor being higher, and to make a gradient of an output torque reduced amount of the electric motor larger as the rotation speed of the electric motor being higher if a rotation speed of the electric motor rises at the time of upshift of the transmission higher than a rotation speed before the shift.

4 Claims, 9 Drawing Sheets

FIG.2

|  | B1 | B2 |
|---|---|---|
| LOW-SPEED STAGE Lo (FIRST SPEED) | × | ○ |
| HIGH-SPEED STAGE Hi (SECOND SPEED) | ○ | × |

○ : ENGAGEMENT OF BRAKE
× : RELEASE OF BRAKE

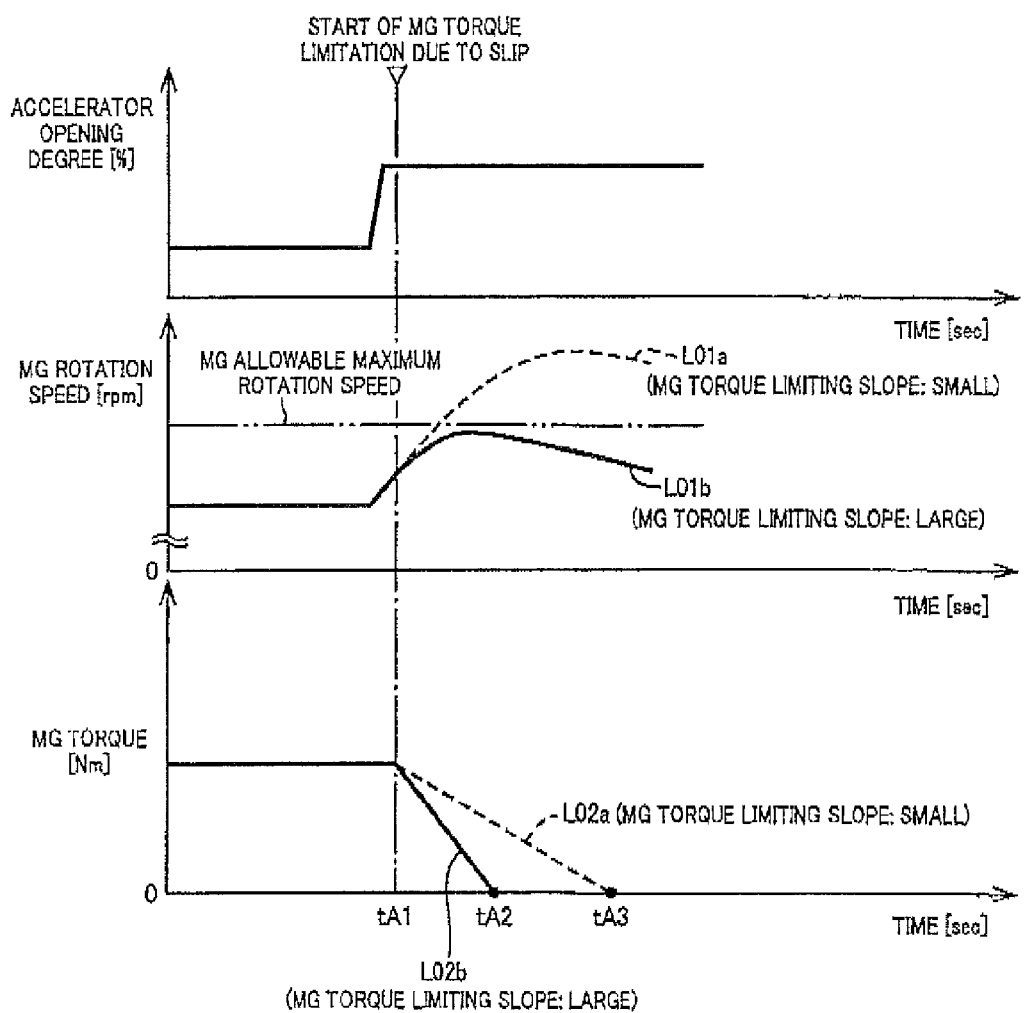

CONTROL DEVICE OF VEHICLE DRIVE DEVICE

TECHNICAL FIELD

The present invention relates to a technique of controlling an electric motor in a vehicle having the electric motor as a drive power source.

BACKGROUND ART

A control device of a vehicle drive device is well known that includes an electric motor as a drive power source for running as is commonly seen in hybrid vehicles and electric vehicles. For example, this corresponds to a control device of a vehicle drive device of Patent Document 1.

The vehicle drive device of Patent Document 1 includes an engine outputting power to drive wheels, a first electric motor generating electricity from a portion of the output power of the engine, and a second electric motor capable of input/output of power from/to the drive wheels. The control device of the vehicle drive device limits a required torque to be output to an output rotating member of the vehicle drive device to a lower level in a high rotation speed region of the second electric motor as a second electric is motor rotation speed increases, so as to prevent higher rotation of the second electric motor and suppress overcharge of an electric-motor power source (battery). Specifically, in the limitation of the required torque, as depicted in FIG. 7 of Patent Document 1, a required torque limit value is set in advance to be reduced at a certain reduction rate relative to an increase in the second electric motor rotation speed and the required torque is limited by determining the required torque so as not to exceed the required torque limit value.

Patent Document 2 discloses a technique of limiting an output torque of a second electric motor (hereinafter referred to as a second electric motor torque) in a vehicle drive device including an engine outputting power to drive wheels, a first electric motor that is an electric generator generating electricity from a portion of the output of the engine, and the second electric motor that is a motor capable of input/output of power from/to the drive wheels. Although the control device of the vehicle drive device described in Patent Document 2 limits the second electric motor torque toward zero at the time of slip of the drive wheels, a reduced amount per unit time of the second electric is motor torque (hereinafter referred to as an MG torque limiting slope) is variable depending on a charge limitation state of a battery and a level of electric power generation of the first electric motor. As a result, a temporarily high voltage on the input side of the electric motors is suppressed to protect a high power system circuit for supplying elect is power to the first electric motor and the second electric motor.

PRIOR ART DOCUMENTS

Patent Documents

Patent Document 1: Japanese Laid-Open Patent Publication No. 2005-313865
Patent Document 2: Japanese Laid-Open Patent Publication No. 2008-087649

SUMMARY OF THE INVENTION

Problems to be Solved by the Invention

Although a vehicle having an electric motor acting as a drive power source for running limits an output torque of the electric motor (electric motor torque) as a rotation speed of the electric motor increases so as to prevent higher rotation of the electric motor in the same way as, for example, the control device of Patent Document 1, the electric motor rotation speed may temporarily sharply rise at the time of a shift of an automatic transmission interposed between the electric motor and drive wheels, for example, and since the electric motor rotation speed rapidly increases in such a case, the electric motor torque is accordingly rapidly reduced. As a result, a reduced amount per unit time (electric motor output reduction rate) of the output of the electric motor (electric motor output) becomes very large. Although not explicitly described in Patent Document 1, an inverter is typically interposed between the electric motor and an electric-motor power source and the power source side of the inverter is connected to a smoothing capacitor for smoothing an input voltage to the inverter. When the electric motor output reduction rate becomes very large, surplus power is temporarily generated due to a response delay etc., of a power source circuit including the smoothing capacitor and makes a terminal voltage of the smoothing capacitor higher and, therefore, the higher terminal voltage of the smoothing capacitor must be suppressed to protect the inverter. Although it is conceivable that an electrostatic capacity of the smoothing capacitor is made larger to suppress the higher terminal voltage of the smoothing capacitor, this is difficult because of a significant cost increase and in terms of mountability on a vehicle since the smoothing capacitor is increased in size. On the other hand, it is conceivable that a limit value (upper limit value) to the electric motor torque is set in advance to be reduced in a high rotation speed region of the electric motor at a constant reduction rate (reduction gradient) relative to an increase in the electric motor rotation speed, for example, by reference to FIG. 7 of Patent Document 1, thereby imposing a limitation on torque to prevent the electric motor torque from exceeding the limit value. However, if the torque is limited in this way, a reduction rate of the limit value must be made smaller so as to make the electric motor output reduction rate smaller. As a result, in the increasing process of the electric motor rotation speed, the limit value to the electric motor torque is reduced from a somewhat lower electric motor rotation speed depending on the electric motor rotation speed, possibly resulting in power performance deterioration such as limitation on maximum vehicle speed. Such a problem is not known.

The control device of the vehicle drive device described in Patent Document 2 also has a problem that is not known. FIG. 13 is a diagram for explaining the problem. FIG. 13 is a time chart of an example of limitation on the second electric motor torque when an accelerator pedal is depressed and the drive wheels slip in the vehicle drive device of Patent Document 2. In FIG. 13, MG denotes the second electric motor and, in time charts of MG rotation speed (second electric motor rotation speed) and MG torque (second electric motor torque), broken lines L01$a$ and L02$a$ represent the case that the MG torque limiting slope is smaller while solid lines L01$b$ and L02$b$ represent the case that the MG torque limiting slope is larger.

In FIG. 13, at time tA1, MG torque limitation for reducing the MG torque is started due to a slip of the drive wheels. Therefore, the MG torque starts decreasing at time tA1. The MG torque reaches zero at time tA2 if the MG torque limiting slope is larger while the MG torque reaches zero at time tA3 later than time tA2 if the MG torque limiting slope is smaller. Therefore, as depicted in the time chart of the MG rotation speed, for example, a predetermined allowable maximum rotation speed of the second electric motor (MG allowable maximum rotation speed) is exceeded by the broken line L01$a$ and not exceeded by the solid line L01$b$. In short, an increased amount of the MG rotation speed during the MG torque limitation varies depending on a degree of the MG torque limiting slope immediately after the time point (time tA1) when the MG torque starts to be narrowed. This is because, for example, as can be seen from a mutual difference between the MG rotation speed indicated by the solid line L01b at time tA2 and the MG rotation speed indicated by the broken line L01a at time tA3, the MG rotation speed capable of turning the MG torque to zero in the MG torque limitation is different and inconstant depending on a degree of the MG torque limiting slope. Therefore, the MG torque limitation imposed by the control device of the vehicle drive device described in Patent Document 2 is not suitable for limiting the MG rotation speed to a desired rotation speed or less and, simply stated, it is problematic that the prevention of higher rotation of the second electric motor (MG) cannot certainly be implemented.

The present invention was conceived in view of the situations and it is therefore S an object of the present invention to provide a control device of a vehicle drive device capable of suppressing higher rotation of an electric motor and alleviating power performance deterioration of a vehicle when an output torque of the electric motor is limited in a vehicle drive device including the electric motor and an automatic transmission making up a power transmission path between the electric motor and drive wheels.

Means for Solving the Problem

To achieve the object, the first aspect of the invention provides (a) a control device of a vehicle drive device having an electric motor connected via an inverter to an electric-motor power source, an inverter smoothing capacitor connected to the inverter on the electric-motor power source side thereof and a transmission making up a portion of a power transmission path between the electric motor and drive wheels, wherein (b) if a rotation speed of the electric motor rises at the time of upshift of the transmission higher than a rotation speed before the shift, the control device makes an output torque of the electric motor smaller as the rotation speed of the electric motor is higher, and makes a gradient of an output torque reduced amount of the electric motor larger as the rotation speed of the electric motor is higher.

In a case such as a sharp rise of the rotation speed of the electric motor (hereinafter referred to as electric motor rotation speed), electric motor acceleration, i.e., an increase rate of the electric motor rotation speed, becomes higher when the output torque of the electric motor (hereinafter referred to as electric motor torque) is larger. Therefore, in a conventional technique of limiting the electric motor torque with a constant gradient of an output torque reduced amount of the electric motor (electric motor torque reduction gradient), i.e., a rate of the output torque reduced amount of the electric motor relative to a rotation speed increased amount of the electric motor, a surplus power temporarily generated in association with the limitation of the electric motor torque is maximized at the largest electric motor torque, i.e., at the highest point of the electric motor rotation acceleration, in the process of limiting and reducing the electric motor torque. Therefore, the electric motor torque reduction gradient of the conventional technique is determined such that an inverter can be protected from, for example, the surplus power at the start of the electric motor torque reduction in the process of limiting and reducing the electric motor torque. On the other hand, with the first aspect of the invention, the electric motor torque reduction gradient is smaller in a high electric motor torque region in which the electric motor torque is high, and is larger in a low electric motor torque region in which the electric motor torque is low. Since the electric motor rotation acceleration is sufficiently low in the low electric motor torque region even if the electric motor torque reduction gradient is large, a reduced amount per unit time of the electric motor torque is not very large, i.e., the surplus power is not very large. Therefore, in the first aspect of the invention, the electric motor torque reduction gradient in the low electric motor torque region can be made larger than the conventional technique. Therefore, in the first aspect of the invention, when the higher rotation of the electric motor is suppressed to the same predetermined electric motor rotation speed as the conventional technique, in the increasing process of the electric motor rotation speed when the electric motor rotation speed sharply rises, the electric motor torque can be caused to start decreasing from the electric motor rotation speed higher than the conventional technique. Therefore, the first aspect of the invention can suppress the higher rotation of the electric motor equivalently to the conventional technique, can acquire the protection of the inverter from the surplus power equivalently to the conventional technique, and can also alleviate the power performance deterioration of the vehicle when the electric motor torque is limited.

If the power performance deterioration of the vehicle is made approximately equivalent to the conventional technique, for example when the output torque of the electric motor is limited in the first aspect of the invention, the maximum value of the surplus power generated by limiting the output torque of the electric motor can be made smaller than the conventional technique. Therefore, the inverter smoothing capacitor with a smaller electrostatic capacity is employable and the inverter smoothing capacitor can be reduced in size and cost.

The second aspect of the invention provides the control device of a vehicle drive device recited in the first aspect of the invention, wherein if a rotation speed of the electric motor rises at the time of upshift of the transmission higher than a rotation speed before the shift, the control device sets the output torque of the electric motor to zero or less if the rotation speed of the electric motor is equal to or greater than a predefined rotation speed equal to or less than a predetermined allowable maximum rotation speed of the electric motor. Consequently, since the electric motor rotation speed is reduced due to rotational resistance etc., of the electric motor when the electric motor torque is equal to or less than zero, the electric motor rotation speed can be prevented from exceeding the allowable maximum rotation speed.

The third aspect of the invention provides the control device of a vehicle drive device recited in the first or second aspect of the invention, wherein (a) if a rotation speed of the electric motor rises at the time of upshift of the transmission higher than a rotation speed before the shift, the control device limits the output torque of the electric motor to an electric motor torque limit value or less, wherein the electric motor torque limit value is smaller as the rotation speed of the electric motor is higher, wherein (b) a rate of a reduced amount of the electric motor torque limit value relative to a rotation speed increased amount of the electric motor is larger as the rotation speed of the electric motor is higher, and wherein (e) the electric motor torque limit value is determined such that a predetermined allowable voltage is not exceeded by a terminal voltage of the inverter smoothing capacitor increasing in conjunction with a decrease in the output torque of the electric motor if the rotation speed of the electric motor rises at the time of upshift of the transmission. Consequently, if the rotation speed of the electric motor sharply rises at the time of upshift of the transmission higher than a rotation speed before the shift, the higher rotation of the electric motor can be suppressed while the terminal voltage of the inverter smoothing capacitor is prevented from exceeding the predetermined allowable voltage.

The fourth aspect of the invention provides the control device of a vehicle drive device recited in any one of the first to third aspects of the invention, wherein if the transmission is at a highest shift stage on the highest vehicle speed side, the control device allows an output torque of the electric motor larger than the case of a shift stage of the transmission other than the highest shift stage when compared without changing the rotation speed of the electric motor. An upshift of the transmission is not performed if the transmission is at the highest shift stage. Although the electric motor rotation speed may sharply rise, for example, at the time of slip of the drive wheels in the actual vehicle, the sharp rise of the electric motor rotation speed is not so rapid as at the time of upshift partially because the rotational resistance of the drive wheels to a road surface is generated and the rotating members such as the drive wheels are still coupled to the electric motor at the time of the slip. Therefore, as described in the fourth aspect of the invention, in the case that the transmission is at the highest shift stage, while the higher rotation of the electric motor is appropriately suppressed, the power performance deterioration of the vehicle during limitation of the electric motor torque can further be alleviated.

Preferably, the electric motor torque limit value is smaller when the terminal voltage of the inverter smoothing capacitor is higher or when an electric charge accumulated in the inverter smoothing capacitor is larger.

Preferably, the electric motor torque limit value is smaller when the rotation speed of the electric motor is higher in a rotation speed range higher than a predetermined torque limitation start rotation speed of the electric motor.

BRIEF DESCRIPTION OF THE DRAWINGS

FIG. 2 is an engagement operation table of an automatic transmission included in the vehicle drive device of FIG. 1.

FIG. 13 is a time chart of an example of limitation on the second electric motor torque when an accelerator pedal is depressed and the drive wheels slip in the vehicle drive device of Patent Document 2 for explaining the problem included in the control device of the vehicle drive device of Patent Document 2.

MODE FOR CARRYING OUT THE INVENTION

Figure 1:
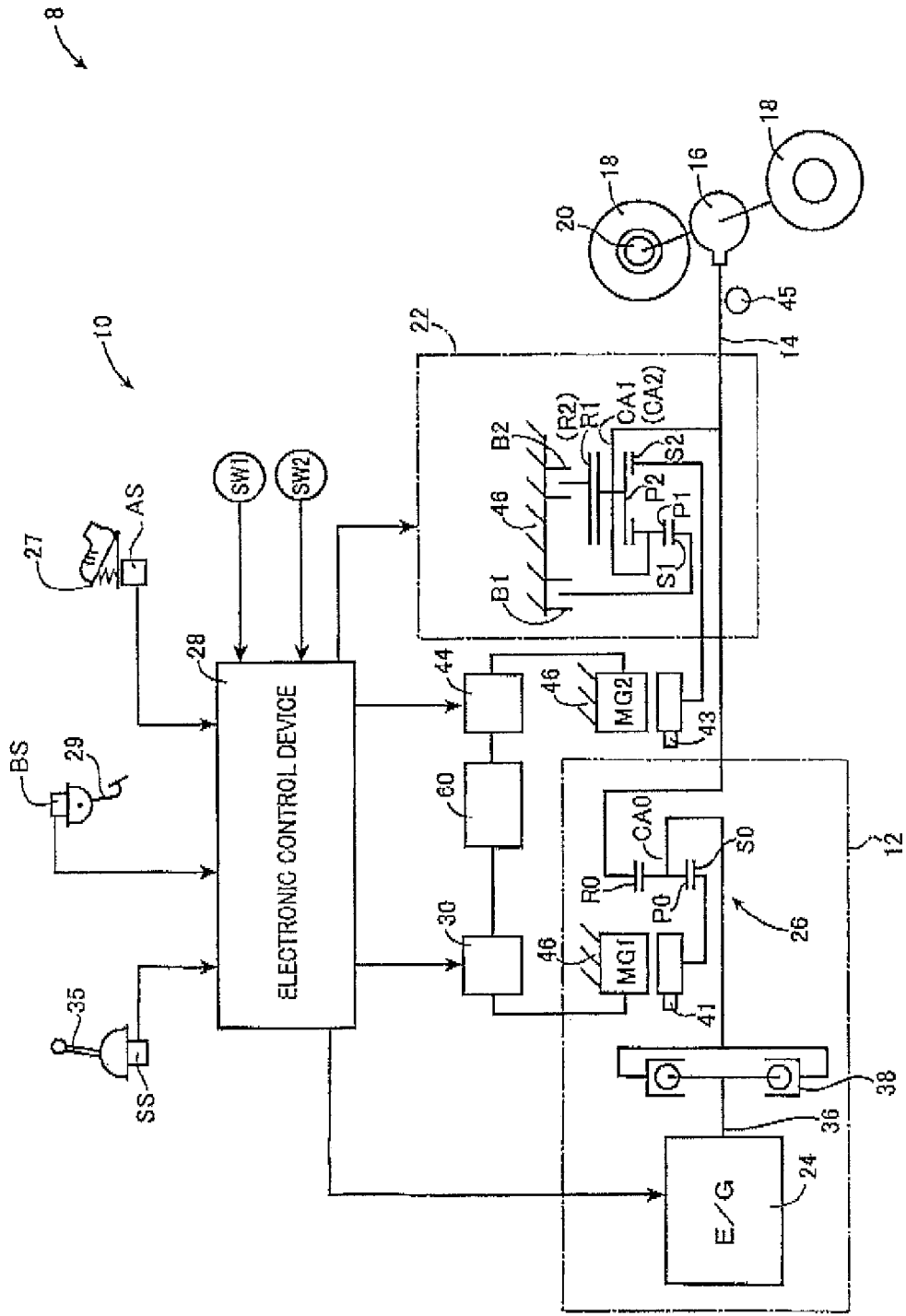
FIG. 1 is a diagram of a general configuration for explaining a vehicle drive device used with a hybrid vehicle to which the present invention is applied.

An example of the present invention will now be described in detail with reference to the drawings.
First Embodiment FIG. 1 is a diagram of a general configuration for explaining a vehicle drive device 10 (hereinafter referred to as the "drive device 10") used with a hybrid vehicle (hereinafter referred to as the "vehicle 8") to which the present invention is applied. In FIG. 1, the drive device 10 includes a first drive source 12 that is a main drive source, a wheel-side output shaft 14 (hereinafter referred to as the "output shaft 14") acting as an output member, a differential gear device 16, a second electric motor MG2 acting as an electric motor for running, and an automatic transmission 22, in the vehicle 8, the drive device 10 transmits torque of the first drive source 12 to the output shaft 14 and then transmits the torque from the output shaft 14 via the differential gear device 16 to a pair of left and right drive wheels 18. The drive device 10 has the second electric motor MG2 capable of selectively providing power running control for outputting drive power for running and regenerative control for recovering energy and the second electric motor MG2 is coupled via the automatic transmission 22 to the output shaft 14 in a power transmittable manner. Therefore, an output torque transmitted from the second electric motor MG2 to the output shaft 14 is increased and decreased depending on a gear ratio γs (=rotation speed Nmg2 of the second electric motor MG2/rotation speed Nout of the output shaft 14) set by the automatic transmission 22.

The automatic transmission 22 (corresponding to a transmission of the present invention) making up a portion of a power transmission path between the second electric motor MG2 (corresponding to an electric motor of the present invention) and the output shaft 14 (the drive wheels 18) is configured such that a plurality of stages having the gear ratio γs greater than "1" can be established; during power running when torque is output from the second electric motor MG2, the torque can be increased and transmitted to the output shaft 14; and, therefore, the second electric motor MG2 is configured with a lower capacity or in a smaller size. As a result, if the rotation speed Nout of the output shaft 14 (referred to as an "output shaft rotation speed Nout") is increased, for example, in association with a higher vehicle speed, the rotation speed of the second electric motor MG2 (hereinafter referred to as a second electric motor rotation speed Nmg2) is reduced by making the gear ratio γs smaller so as to maintain the operation efficiency of the second electric motor MG2 in a favorable state, or if the output shaft rotation speed Nout is reduced, the gear ratio γs is made large to increase the second electric motor rotation speed Nmg2.

The first drive source 12 is mainly made up of an engine 24 acting as a main power source, a first electric motor MG1 acting as a differential electric motor, and a planetary gear device 26 acting as a power distribution mechanism (differential mechanism) for combining or distributing torque between the engine 24 and the first electric motor MG1. The engine 24 is a known internal combustion engine that combusts fuel to output power, such as a gasoline engine and a diesel engine, and is configured to have an operational state, such as a throttle valve opening degree and an intake air amount, a fuel supply amount, and ignition timing, electrically controlled by an electronic control device 28 mainly made up of a microcomputer and having functions as an engine-control electronic control unit (E-ECU).

The first electric motor MG1 is, for example, an alternating-current synchronous electric motor generating a rotating magnetic field with a three-phase alternating current to rotate a rotor including permanent magnets and is a motor generator configured to selectively produce a function as an electric motor generating a drive torque and a function as an electric generator. The first electric motor MG1 is connected via a first inverter 30 to an electric storage device 32 (see FIG. 3). The electronic control device 28 also has a function as a motor-generator-control electronic control unit (MG-ECU) and the first inverter 30 is controlled by the electronic control device 28 to adjust or set the output torque or a regenerative torque of the first electric motor MG1.

The planetary gear device 26 is a single pinion type planetary gear mechanism that includes a sun gear S0, a ring gear R0 disposed concentrically with the sun gear S0, and a carrier CA0 supporting a pinion gear P0 meshing with the sun gear S0 and the ring gear R0 in a rotatable and revolvable manner as three rotating elements to generate a known differential action. The planetary gear device 26 is disposed concentrically with the engine 24 and the automatic transmission 22. Since the planetary gear device 26 and the automatic transmission 22 are symmetrically configured relative to a center line, the lower halves thereof are not depicted in FIG. 1.

In this embodiment, a crankshaft 36 of the engine 24 is coupled via a damper 38 to the carrier CA0 of the planetary gear device 26. On the other hand, the sun gear S0 is coupled to the first electric motor MG1, and the ring gear R0 is coupled to the output shaft 14. The carrier CA0 acts as an input element; the sun gear S0 acts as a reaction force element; and the ring gear R0 acts as an output element.

If a reaction torque from the first electric motor MG1 is input to the sun gear S0 for the output torque of the engine 24 input to the carrier CA0 in the single pinion type planetary gear device 26 acting as a differential mechanism, a direct torque occurs in the ring gear R0 that is the output element and, therefore, the first electric motor MG1 acts as an electric generator. When the rotation speed of the ring gear R0, i.e., the output shaft rotation speed Nout is constant, a rotation speed Ne of the engine 24 (hereinafter referred to as "engine rotation speed Ne") can be changed continuously, i.e., in a stepless manner, by changing a rotation speed Nmg1 of the first electric motor MG1 (hereinafter referred to as "first electric motor rotation speed Nmg1") higher and lower. Therefore, for example, control of setting the engine rotation speed Ne to the rotation speed optimum for fuel efficiency can be provided by controlling the first electric motor MG1. This kind of hybrid type is referred to as a mechanical distribution or split type. As described above, a differential state of the planetary gear device 26 is electrically controlled by the first electric motor MG1. In this embodiment, for example, the fuel efficiency refers to a running distance per unit fuel consumption etc., and improvement in fuel efficiency refers to extension of the running distance per unit fuel consumption, or reduction in fuel consumption rate (=fuel consumption/drive wheel output) of the vehicle as a whole. Contrarily, reduction (deterioration) in fuel efficiency refers to shortening of the running distance per unit fuel consumption or increase in fuel consumption rate of the vehicle as a whole.

Figure 4:
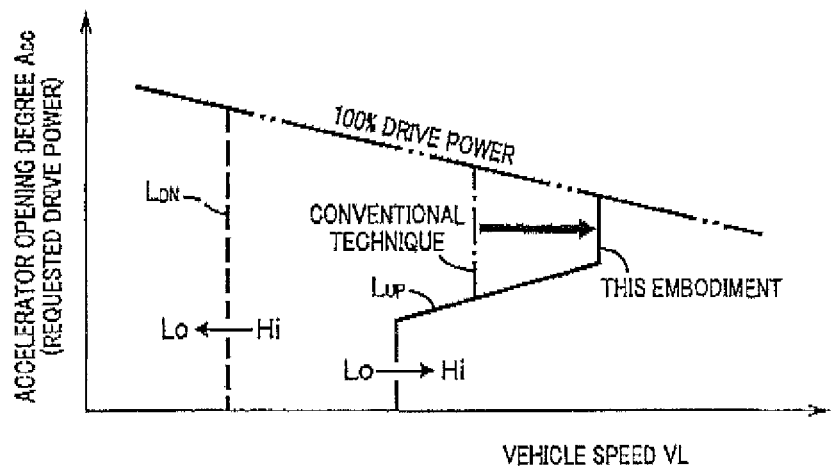
FIG. 4 is a preliminarily determined shift diagram for determining a shift of the automatic transmission on the basis of a vehicle speed and an accelerator opening degree in the vehicle drive device of FIG. 1.

The automatic transmission 22 makes up a portion of the power transmission path between the second electric motor MG2 and the drive wheels 18 and is a stepped transmission shifted to one of a plurality of gear stages (shift stages) Hi and Lo based on a vehicle state from a predetermined shift diagram as depicted in FIG. 4, for example. Specifically, the automatic transmission 22 is made up of a first brake B1, a second brake B2, and a set of Ravigneaux type planetary gear mechanisms. In other words, the automatic transmission 22 is disposed with a first sun gear S1 and a second sun gear S2; a stepped pinion P1 meshes with the first sun gear S1; the stepped pinion P1 meshes with a pinion P2, and the pinion P2 meshes with a ring gear R1 (R2) disposed concentrically with the sun gears S1, S2. The pinions P1, P2 are held by a common carrier CA1 (CA2) in a rotatable and revolvable manner. The second sun gear S2 meshes with the pinion P2.

The second electric motor MG2 is, for example, a three-phase alternating-current synchronous electric motor of the same type as the first electric motor MG1 and is a motor generator configured to selectively produce a function as an electric motor generating a drive torque and a function as an electric generator. The second electric motor MG2 is connected via a second inverter 44 to the electric storage device 32 (see FIG. 3). The second electric motor MG2 is controlled via the second inverter 44 by the electronic control device 28 acting as the motor-generator-control electronic control unit (MG-ECU) to act as an electric motor or an electric generator and an assist output torque or a regenerative torque is adjusted or set. The second sun gear S2 is coupled to the second electric motor MG2 and the carrier CA1 is coupled to the output shaft 14. The first sun gear S1 and the ring gear R1 make up a mechanism corresponding to a double pinion type planetary gear device along with the pinions P1 and P2 and the second sun gear S2 and the ring gear R1 make up a mechanism corresponding to a single pinion type planetary gear device along with the pinion P2.

The automatic transmission 22 is disposed with a first brake B1 disposed for selectively fixing the sun gear S1 between the sun gear S1 and a housing 46 that is a non-rotating member, and a second brake B2 disposed for selectively fixing the ring gear R1 between the ring gear R1 and the housing 46. The brakes B1 and B2 are so-called friction engagement devices using a frictional force to generate a braking force and are implemented by employing wet multi-plate type engagement devices or band type engagement devices. The brakes B1 and B2 are configured such that torque capacities thereof are respectively continuously changed depending on engagement pressures generated by a hydraulic actuator for the brake B1 and a hydraulic actuator for the brake B2 such as hydraulic cylinders.

In the automatic transmission 22 configured as described above, the sun gear S2 acts as an input element and the carriers CA1 and CA2 act as output elements. As depicted in an engagement table of FIG. 2, the automatic transmission 22 is configured such that a high-speed stage Hi is established with a gear ratio γsh greater than "1" when the first brake B1 is engaged and the second brake B2 is released, while a low-speed stage Lo is established with a gear ratio γsl greater than the gear ratio γsh of the high-speed stage Hi when the second brake B2 is engaged and the first brake B1 is released. Therefore, the automatic transmission 22 is a two-speed stepped transmission in which a clutch-to-clutch shift is performed by releasing a release-side engagement device and engaging an engagement-side engagement device or, in other words, by switching the gripping of these engagement elements (engagement devices). A shift between the gear stages Hi and Lo is performed based on a running state such as vehicle speed VL and requested drive power (or an accelerator opening degree Acc). More specifically, shift stage regions are determined in advance as a map (shift diagram) and control is provided such that one of the shift stages is set depending on a detected operation state. The electronic control device 28 also acts as a transmission-control electronic control unit (T-ECU) for providing such shift control of the automatic transmission 22.

Since the both gear ratios γsl and γsh are greater than "1" as described above, while each of the gear stages Lo and Hi is steadily set, the torque applied to the output shaft 14 is a torque acquired by increasing an output torque Tmg2 of the second electric motor MG2 (hereinafter referred to as second electric motor torque Tmg2) in accordance with each of the gear ratios; however, while the automatic transmission 22 is in a shift transient state, the torque is affected by the torque capacities of the brakes B1, B2 and an inertia torque associated with a change in rotation speed. The torque applied from the second electric motor MG2 to the output shaft 14 is positive torque while the second electric motor MG2 is in a driving state and is negative torque while the second electric motor MG2 is in a driven state. The driven state of the second electric motor MG2 is a state in which the rotation of the output shaft 14 is transmitted via the automatic transmission 22 to the second electric motor MG2 to rotationally drive the second electric motor MG2, and the driven state is not necessarily coincident with a driving or driven state of a vehicle.

As depicted in FIG. 1, each of the drive wheels 18 is disposed with a wheel brake device 20. This wheel brake device 20 is a well-known disk brake device or drum brake device and restrains the rotation of the drive wheels 18 with a braking force corresponding to a depressing force on a brake pedal 29. However, if the second electric motor MG2 is in regenerative operation and the regenerative torque thereof acts as a braking force on the drive wheels 18, the braking force from the wheel brake device 20 or the braking force from the regenerative torque is adjusted such that a braking force acquired by combining the braking force from the regenerative torque and the braking force from the wheel brake device 20 acts as the braking force corresponding to the depressing force on the brake pedal 29. Although not depicted in FIG. 1, the wheel brake device 20 is disposed on each of driven wheels included in the vehicle 8.

The electronic control device 28 is configured to have, for example, functions as the engine-control electronic control unit (E-ECU) for controlling the engine 24, the MG-control electronic control unit (MG-ECU) for controlling the first electric motor MG1 and the second electric motor MG2, and the transmission-control electronic control unit (T-ECU) for controlling the automatic transmission 22. The electronic control device 28 is supplied with a signal indicative of the first electric motor rotation speed Nmg1 from a first electric motor rotation speed sensor 41 such as a resolver, a signal indicative of the second electric motor rotation speed Nmg2 from a second electric motor rotation speed sensor 43 such as a resolver, a signal indicative of the output shaft rotation speed Nout corresponding to the vehicle speed VL from an output shaft rotation speed sensor 45, a signal indicative of an oil pressure PB1 of the first brake B1 (hereinafter referred to as a "first brake oil pressure PB1") from an oil pressure switch signal SW1, a signal indicative of an oil pressure PB2 of the second brake B2 (hereinafter referred to as a "second brake oil pressure PB2") from an oil pressure switch SW2, a signal indicative of an operation position of a shift lever 35 from an operation position sensor SS, a signal from an accelerator operation amount sensor AS indicative of an operation amount of an accelerator pedal 27 (accelerator opening degree Acc) corresponding to requested drive power requested by a driver, a signal indicative of the presence of operation of the brake pedal 29 from a brake sensor BS, etc. Additionally, the electronic control device 28 is supplied from sensors etc., not depicted with a signal indicative of a charging current or discharging current (hereinafter referred to as charging/discharging current or input/output current) Icd of the electric storage device 32, a signal indicative of a voltage Vbat of the electric storage device 32, a signal indicative of a charge remaining amount (state of charge) SOC of the electric storage device 32, a signal indicative of a supply current Img1 of the first inverter 30 to the first electric motor MG1 corresponding to an output torque Tmg1 or a regenerative torque of the first electric motor MG1, a signal indicative of a supply current Img2 of the second inverter 44 to the second electric motor MG2 corresponding to the output torque Tmg2 or a regenerative torque of the second electric motor MG2, etc.

Figure 3:
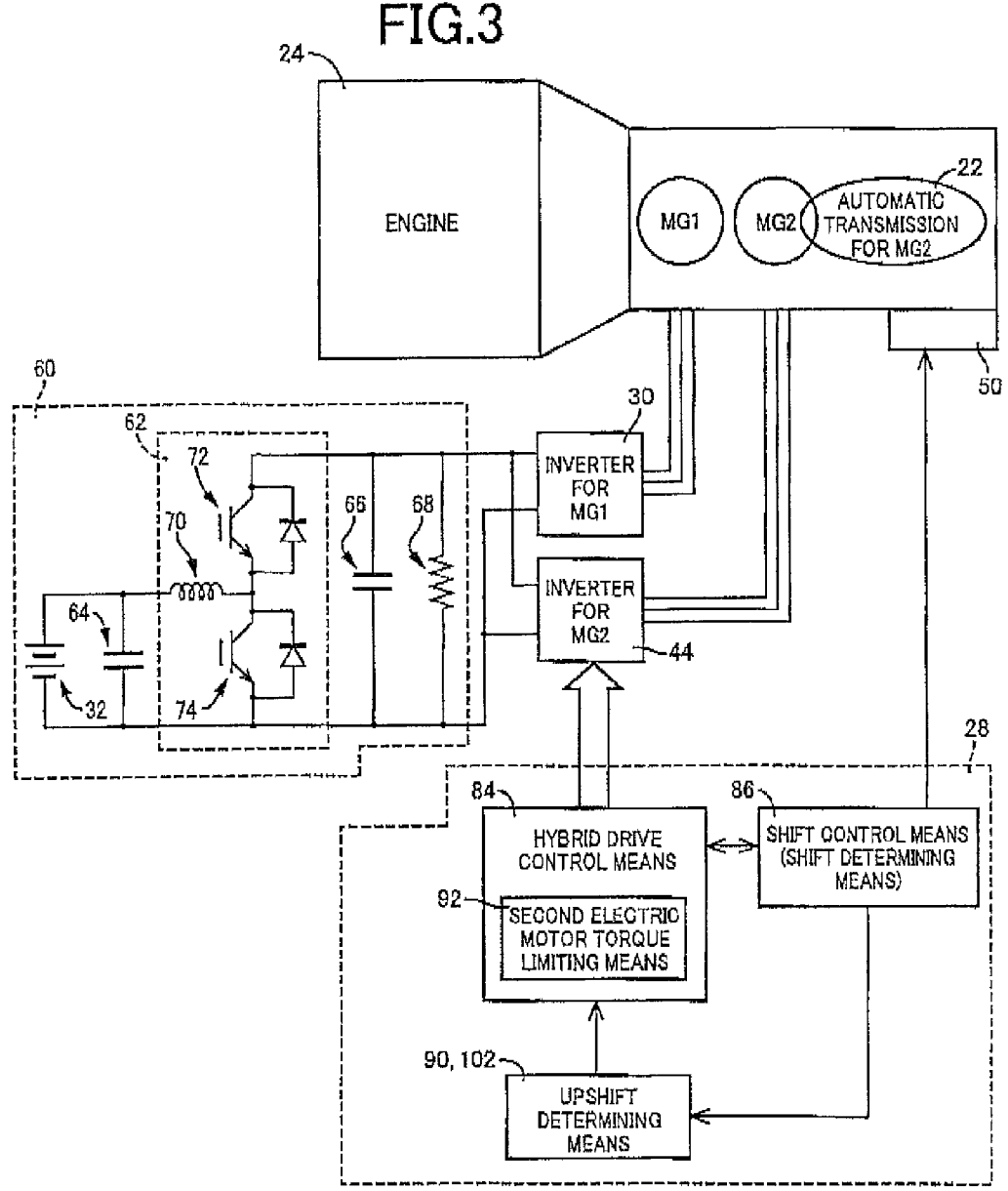
FIG. 3 is a diagram of a general configuration of a power source control circuit for supplying electric power to a first electric motor and a second electric motor that are disposed in the vehicle drive device of FIG. 1, and is also a functional block diagram for explaining a main portion of the control function of an electronic control device.

FIG. 3 is a diagram of a general configuration of a power source control circuit 60 for supplying electric power to the first electric motor MG1 and the second electric motor MG2. FIG. 3 is also a functional block diagram for explaining a main portion of the control function of the electronic control device 28.

The drive device 10 also includes the electronic control device 28, the first inverter 30, the second inverter 44, and the power source control circuit 60. As depicted in FIG. 3, the power source control circuit 60 is connected to each of the first inverter 30 and the second inverter 44 and includes the electric storage device 32 (corresponding to an electric-motor power source of the present invention), a voltage transducer 62, a smoothing capacitor 64 on the electric storage device side, and a smoothing capacitor 66 on the inverter side (corresponding to an inverter smoothing capacitor of the present invention; hereinafter referred to as the "inverter smoothing capacitor 66"), and a discharge resistor 68. The second inverter 44 corresponds to an inverter of the present invention.

The electric storage device 32 is a chargeable/dischargeable secondary battery capable of mutually giving and receiving electric power to/from each of the first electric motor MG1 and the second electric motor MG2 and exemplarily illustrated as a lithium-ion assembled battery or a nickel-hydride assembled battery. The electric storage device 32 may be a capacitor, for example.

The voltage transducer 62 includes a reactor 70 and two switching elements 72 and 74 and is a step-up/down circuit increasing and supplying a voltage on the side of the electric storage device 32 toward the inverters 30 and 44 during a driving period and decreasing and supplying a voltage on the side of the inverters 30 and 44 toward the electric storage device 32 during a regenerative period. A positive electrode bus line and a negative electrode bus line of the voltage transducer 62 are respectively connected to positive electrode bus lines and negative electrode bus lines of the two inverters 30 and 44.

The reactor 70 has one end connected to the positive electrode bus line on the electric storage device 32 side and the other end connected to a connection point between the two switching elements 72 and 74 connected in series with each other and is a device capable of accumulating magnetic energy. The reactor 70 is utilized as inductance by wounding a coil around a core that is a magnetic body and by applying a high-frequency signal to the coil and can make up a step-up/down circuit along with the switching elements 72 and 74.

The two switching elements 72 and 74 are high-power switching transistors connected in series with each other and disposed between the positive electrode bus line and the negative electrode bus line of the inverters 30 and 44. A connection point between the two switching elements 72 and 74 is connected to the other end of the reactor 70 as described above. The switching elements 72 and 74 are insulated gate bipolar transistors, for example. Although the switching elements 72 and 74 are of the n-channel type in FIG. 3, the switching elements 72 and 74 can be of the p-channel type because of voltage. Each of the two switching elements 72 and 74 is connected with a diode in parallel.

The one switching element 72 of the two switching elements 72 and 74 has a collector terminal connected to the positive electrode bus line of the inverters 30 and 44, an emitter terminal connected to a collector terminal of the other switching element 74, and a gate terminal connected as a control terminal to a control signal line from the electronic control device 28. The other switching element 74 has the collector terminal connected to the emitter terminal of the one switching element 72 as described above, an emitter terminal connected to the electric storage device 32 and the negative electrode bus line common to the inverters 30 and 44, and a gate terminal connected as a control terminal to the control signal line from the electronic control device 28.

For example, when the voltage transducer 62 performs step-up operation, the switching element 72 is turned off and the switching element 74 is put into a switching state in which on- and off-states are alternately repeated. In the switching state, the switching element is repeatedly turned on and off with a cycle of several hundred thousand times per second. In such a state, while the switching element 74 is on, the other end of the reactor 70 is connected to the negative electrode bus line to allow an electric current to flow through the reactor 70, and resulting energy is accumulated in the reactor 70. At the moment of switching of the switching element 74 from ON to OFF, the accumulated energy is released from the reactor 70 and the voltage of the other end of the reactor 70 increases. As a result, since the other end of the reactor 70 is connected through a diode parallel to the switching element 72 to the inverter smoothing capacitor 66, if the voltage of the other end becomes higher than a terminal voltage Vcon of the inverter smoothing capacitor 66 (hereinafter referred to as a "smoothing capacitor voltage Vcon"), the inverter smoothing capacitor 66 is charged and the smoothing capacitor voltage Vcon increases. The one- and off-states of the switching element 74 are alternately repeated in this way, resulting in a rise of the smoothing capacitor voltage Vcon, i.e., a secondary side voltage. A control circuit not depicted switches off the switching element 74 if the secondary side voltage becomes equal to or greater than a predetermined secondary side reference voltage and reversely puts the switching element 74 into the switching state if the secondary side voltage falls below the secondary side reference voltage. Since the voltage transducer 62 performs the step-up operation as described above, if a load change is rapid on the secondary side, the step-up operation of the voltage transducer 62 may not be capable of following the load change. For example, if the power consumption of the inverters 30 and 44 significantly rapidly decreases, the secondary side voltage may temporarily increase due to a delay in the switching of the switching element 74 from the switching state to the off-state.

The smoothing capacitor 64 on the electric storage device side is disposed between the electric storage device 32 and the voltage transducer 62 in parallel with the electric storage device 32 and has a function of suppressing a voltage variation on the lower voltage side, i.e., the electric storage device 32 side, of the voltage transducer 62.

The inverter smoothing capacitor 66 is disposed between the inverters 30, 44 and the voltage transducer 62 in parallel with the inverters 30, 44 and has a function of suppressing a voltage variation (pulsation) on the higher voltage side, i.e., the side of the inverters 30 and 44, of the voltage transducer 62. In other words, the inverter smoothing capacitor 66 is a capacitor connected on the electric storage device 32 side of the inverters 30 and 44 so as to smooth an input voltage from the electric storage device 32 to the inverters 30 and 44, i.e., an input voltage from the voltage transducer 62 to the inverters 30 and 44.

The discharge resistor 68 is a resistor element used when the operation of the power source control circuit 60 is stopped and electric energy accumulated in the inverter smoothing capacitor 66 is discharged.

A main portion of the control function of the electronic control device 28 will be described with reference to FIG. 3. As depicted in FIG. 3, the electronic control device 28 includes a hybrid drive control means 84 as a hybrid drive control portion, a shift control means 86 as a shift control portion, and an upshift determining means 90 as an upshift determining portion. The hybrid drive control means 84 has a second electric motor torque limiting means 92 as a second electric motor torque limiting portion.

For example, after a key is inserted into a key slot, when a power switch is operated to activate the control while a brake pedal is operated, the hybrid drive control means 84 calculates a requested output of a driver based on the accelerator opening degree (accelerator operation amount) Acc and causes the engine 24 and/or the second electric motor MG2 to generate the requested output such that lower fuel consumption and a smaller exhaust gas amount are achieved during the operation. For example, the hybrid drive control means 84 selectively switches a motor running mode using only the second electric motor MG2 as a drive source with the engine 24 stopped, a charging running mode using the second electric motor MG2 as a drive source for running while the first electric motor MG1 generates electricity from the power of the engine 24, an engine running mode mechanically transmitting the power of the engine 24 to the drive wheels 18 for running, etc., depending on a running state. In the engine running mode, the second electric motor MG2 is put into the driving state as needed along with the engine 24 and the second electric motor MG2 outputs an assist torque in some cases.

In the engine running mode, the hybrid drive control means 84 controls the engine rotation speed Ne through the first electric motor MG1 such that the engine 24 operates on a predetermined operation curve such as an optimum fuel consumption curve, for example. During coasting, the second electric motor MG2 is rotationally driven by inertia energy of a vehicle to regenerate electric power, which is stored in the electric storage device 32.

Reverse running is achieved by rotationally driving the second electric motor MG2 in a reverse direction while the automatic transmission 22 is set to the low-speed stage Lo, for example. In this case, the first electric motor MG1 of the first drive source 12 is caused to idle and the output shaft 14 is allowed to rotate in reverse regardless of the operation state of the engine 24.

The shift control means 86 makes a shift determination that the automatic transmission 22 should be shifted based on a vehicle state represented by the vehicle speed VL and the accelerator opening degree Acc from a preliminarily stored shift diagram (shift map) depicted in FIG. 4, for example, and executes a shift process (shift control) of controlling the first brake B1 and the second brake B2 so as to make the switch to a shift stage determined based on the shift determination. In FIG. 4, a solid line $L_{UP}$ is an upshift line (up-line) for switching from the low-speed stage Lo to the high-speed stage Hi while a broken line $L_{DN}$ is a downshift line (down-line) for switching from the high-speed stage Hi to the low-speed stage Lo and predetermined hysteresis is disposed between upshift and downshift. Shift lines indicated by the solid line $L_{UP}$ and the broken line $L_{DN}$ correspond to shift rules and a shift is performed hi accordance with these shift lines. In particular, when the vehicle state crosses the upshift line $L_{UP}$ from a lower vehicle speed region to a higher vehicle speed region in FIG. 4, a shift determination for upshift of the automatic transmission 22 is made and, on the other hand, when the vehicle state crosses the downshift line $L_{DN}$ from a higher vehicle speed region to a lower vehicle speed region, a shift determination for downshift of the automatic transmission 22 is made. As described above, the shift control means 86 functionally includes a shift determining means making a shift determination of the automatic transmission 22 based on the shift diagram depicted in FIG. 4. The shift control means 86 recognizes the vehicle speed VL based on a signal from the output shaft rotation speed sensor 45, for example, and makes the shift determination from the shift diagram depicted in FIG. 4.

The shift control means 86 outputs a shift command for switching to the determined shift stage to a hydraulic control circuit 50 of the automatic transmission 22. The hydraulic control circuit 50 drives a linear solenoid valve included in the hydraulic control circuit 50 in accordance with the shift command to switch the respective operation states of the first brake B1 and the second brake B2.

For example, when the vehicle state represented by the vehicle speed VL and the accelerator opening degree Acc crosses the upshift line $L_{UP}$ due to for example, acceleration during running at the low-speed stage Lo (with the second brake B2 engaged), the shift control is provided to release the second brake B2 and engage the first brake B1. When the vehicle state crosses the downshift line $L_{DN}$ due to, for example, deceleration during running at the high-speed stage Hi (with the first brake B1 engaged), the shift control is provided to release the first brake B1 and engage the second brake B2.

The upshift determining means 90 determines whether upshift control for performing an upshift of the automatic transmission 22 is in operation, i.e., whether the shift control means 86 is providing the upshift control of the automatic transmission 22. The upshift control of the automatic transmission 22 is in in operation from when the vehicle state represented by the vehicle speed VL and the accelerator opening degree Acc crosses the upshift line $L_{UP}$ depicted in FIG. 4 until the completion of a series of controls required for the upshift control of the automatic transmission 22, for example, all of the hydraulic control in the hydraulic control circuit 50, the engine torque control, and torque control of the electric motors MG1 and MG2.

The second electric motor torque limiting means 92 selects a second electric motor torque limitation map for limiting the second electric motor torque Tmg2 depending on the determination of the upshift determining means 90 and limits the second electric motor torque Tmg2 in accordance with the selected second electric motor torque limitation map. Specifically, the second electric motor torque limiting means 92 selects a map indicated by a solid line Lup of FIG. 5 as the second electric motor torque limitation map if the upshift determining means 90 determines that the upshift control of the automatic transmission 22 is in operation, and selects a map indicated by a dashed-two dotted line Lnup of FIG. 5 if the upshift determining means 90 determines that the upshift control of the automatic transmission 22 is not in operation. When selecting any one of the second electric motor torque limitation maps Lup and Lnup, the second electric motor torque limiting means 92 sequentially determines a second electric motor torque limit value LUTmg2, i.e., an upper limit value of the second electric motor torque Tmg2, from the selected second electric motor torque limitation map based on the second electric motor rotation speed Nmg2 and provides the electric motor torque limitation control of sequentially limiting the second electric motor torque Tmg2 to the second electric motor torque limit value LUTmg2 or less. For example, in the electric motor torque limitation control, if the second electric motor torque limit value LUTmg2 is exceeded by a target second electric motor torque Tmg2$t$ that is a target value of the second electric motor torque Tmg2 determined based on a vehicle running state represented by the accelerator opening degree Acc, the vehicle speed VL, etc., the second electric motor torque limiting means 92 replaces the target second electric motor torque Tmg2$t$ with the second electric motor torque limit value LUTmg2 and then controls the supply current Img2 to the second electric motor MG2 such that the second electric motor torque Tmg2 attains the target second electric motor torque Tmg2$t$, thereby limiting the second electric motor torque Tmg2 to the second electric motor torque limit value LUTmg2 or less.

Figure 5:
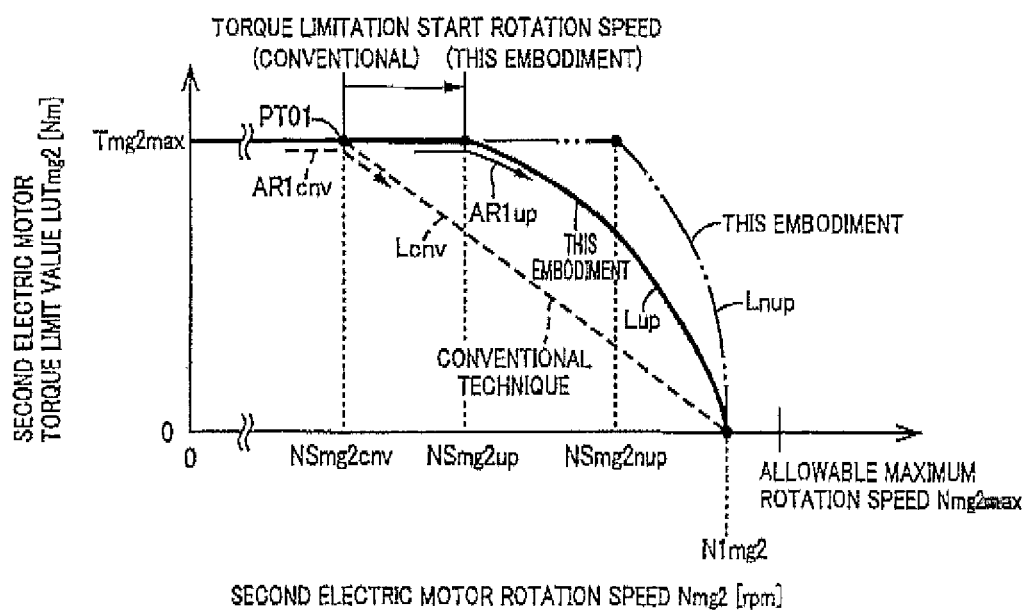
FIG. 5 is a diagram of second electric motor torque limitation maps defining a relationship between a second electric motor torque limit value used in an electric motor torque limitation control provided by the electronic control device of FIG. 3 and a second electric motor rotation speed, and also depicts a second electric motor torque limitation map in a conventional technique for comparison with the conventional technique.

FIG. 5 is a diagram of the second electric motor torque limitation maps Lup and Lnup defining a relationship between the second electric motor torque limit value LUTmg2 and the second electric motor rotation speed Nmg2 and FIG. 5 also depicts a second electric motor torque limitation map in a conventional technique indicated by a broken line Lcnv. If the second electric motor torque limitation maps Lup, Lnup, and Lcnv are represented distinctly from each other in FIG. 5, the second electric motor torque limitation map of the solid line Lup is referred to as an upshift second electric motor torque limitation map Lup; the second electric motor torque limitation map of the dashed-two dotted line Lnup is referred to as a non-upshift second electric motor torque limitation map Lnup; and the second electric motor torque limitation map of the broken line Lcnv is referred to as a conventional second electric motor torque limitation map Lcnv. In the electric motor torque limitation control provided if the second electric motor rotation speed Nmg2 temporarily sharply rises at the time of upshift of the automatic transmission 22, the upshift control of the automatic transmission 22 is in operation and, therefore, the second electric motor torque limit value LUTmg2 is determined from the upshift second electric motor torque limitation map Lup. In the following description, the broken line Lcnv of FIG. 5 is assumed to be employed in the conventional technique as the second electric motor torque limitation map unless otherwise noted.

In FIG. 5, an allowable maximum rotation speed Nmg2max of the second electric motor MG2 is an upper limit of rotation speed at which the second electric motor MG2 can continuously be driven, is empirically determined in advance, and is a rated maximum rotation speed of the second electric motor MG2, for example. Tmg2max of FIG. 5 is a maximum value of the second electric motor torque Tmg2 at which the second electric motor MG2 can continuously be driven, is a second-electric-motor allowable maximum torque empirically determined in advance, and is a rated maximum torque of the second electric motor MG2, for example. In all the second electric motor torque limitation maps Lup, Lnup, and Lcnv, the second electric motor torque limit value LUTmg2 is the second-electric-motor allowable maximum torque Tmg2max and is a constant value on the lower rotation speed side of the second electric motor MG2 while the second electric motor torque limit value LUTmg2 becomes smaller on the higher rotation speed side of the second electric motor MG2 when the second electric motor rotation speed Nmg2 is higher, and reaches zero at a predefined rotation speed N1mg2. The predefined rotation speed N1mg2 is a second-electric-motor zero-torque rotation speed empirically set in advance such that the allowable maximum rotation speed Nmg2max is not exceeded even if the second electric motor rotation speed Nmg2 temporarily rapidly rises due to the second electric motor torque Tmg2, and is set to a rotation speed equal to or less than the allowable maximum rotation speed Nmg2max of the second electric motor MG2, for example, a rotation speed lowered by a predefined margin from the allowable maximum rotation speed Nmg2max.

Each of the second electric motor torque limitation maps Lup, Lnup, and Lcnv of FIG. 5 has a different torque limitation start speed at which the second electric motor torque Tmg2 starts to be limited to a torque lower than the second-electric-motor allowable maximum torque Tmg2max in the increasing process of the second electric motor rotation speed Nmg2. Specifically, as depicted in FIG. 5, a torque limitation start rotation speed NSmg2cnv in the conventional second electric motor torque limitation map Lcnv (hereinafter referred to as a conventional torque limitation start rotation speed NSmg2cnv) is the lowest; a torque limitation start rotation speed NSmg2up in the upshift second electric motor torque limitation map Lup (hereinafter referred to as an upshift torque limitation start rotation speed NSmg2up) is higher than the conventional torque limitation start rotation speed NSmg2cnv; and a torque limitation start rotation speed NSmg2nup in the non-upshift second electric motor torque limitation map Lnup (hereinafter referred to as a non-upshift torque limitation start rotation speed NSmg2nup) is higher than the upshift torque limitation start rotation speed NSmg2up.

Between the torque limitation start rotation speeds NSmg2up, NSmg2nup, NSmg2cnv of the respective second electric motor torque limitation maps Lup, Lnup, Lcnv and the second-electric-motor zero-torque rotation speed N1mg2, electric motor torque limit value reduction gradients are different from each other that are rates of a reduced amount of the second electric motor torque limit value LUTmg2 relative to an increased amount of the second electric motor rotation speed Nmg2. Specifically, the electric motor torque limit value reduction gradient in the conventional second electric motor torque limitation map Lcnv is a constant gradient while the electric motor torque limit value reduction gradient in the upshift second electric motor torque limitation map Lup becomes larger when the second electric motor rotation speed Nmg2 is higher. For example, the electric motor torque limit value reduction gradient of the upshift second electric motor torque limitation map Lup is smaller, i.e., gentler, than the electric motor torque limit value reduction gradient of the conventional second electric motor torque limitation map Lcnv at and near the upshift torque limitation start rotation speed NSmg2up and is larger, i.e., steeper, than the electric motor torque limit value reduction gradient of the conventional second electric motor torque limitation map Lcnv at and near the second-electric-motor zero-torque rotation speed N1mg2. Although the electric motor torque limit value reduction gradient in the non-upshift second electric motor torque limitation map Lnup may be a constant gradient, the gradient becomes larger when the second electric motor rotation speed Nmg2 is higher in this embodiment as depicted in FIG. 5.

At the time of upshift of the automatic transmission 22, for example, in a decreasing process of a release-side oil pressure supplied to a release-side engagement element, the release-side engagement element may slip and cause the second electric motor rotation speed Nmg2 to temporarily sharply rise, and the sharp rise of the second electric motor rotation speed Nmg2 at the time of up shift causes the second electric motor rotation speed Nmg2 to rapidly increase as compared to the other sharp rises such as those caused at the time of slip of the drive wheels 18. Therefore, the electric motor torque limit value reduction gradient in the upshift second electric motor torque limitation map Lup is empirically determined in advance such that, in the entire rotation speed range from the upshift torque limitation start rotation speed NSmg2up to the second-electric-motor zero-torque rotation speed N1mg2, if the second electric motor rotation speed Nmg2 temporarily sharply rises at the time of upshift of the automatic transmission 22, a predetermined allowable voltage LVcon is not exceeded by the smoothing capacitor voltage Vcon increasing in conjunction with a decrease in the second electric motor torque Tmg2 due to the electric motor torque limitation control and such that the second electric motor torque Tmg2 is not excessively limited. For example, to protect constituent parts such as electronic elements included in the inverters 30 and 44, the allowable voltage LVcon is set to a lower withstand voltage of the inverters 30 and 44 or a predefined voltage lowered by a predefined margin from the withstand voltage.

Although empirically determined in advance as is the case with the electric motor torque limit value reduction gradient in the upshift second electric motor torque limitation map Lup, the electric motor torque limit value reduction gradient in the non-upshift second electric motor torque limitation map Lnup is determined, on the assumption of the sharp rise of the second electric motor rotation speed Nmg2 at the time other than the upshift of the automatic transmission 22, for example, at the time of slip of the drive wheels 18, such that, in the entire rotation speed range from the non-upshift torque limitation start rotation speed NSmg2nup to the second-electric-motor zero-torque rotation speed N1mg2, the predetermined allowable voltage LVcon is not exceeded by the smoothing capacitor voltage Vcon and such that the second electric motor torque Tmg2 is not excessively limited. Therefore, when comparing without changing the second electric motor rotation speed Nmg2 in the rotation speed range between the upshift torque limitation start rotation speed NSmg2up and the second-electric-motor zero-torque rotation speed N1mg2 of FIG. 5, the non-upshift second electric motor torque limitation map Lnup has a larger second electric motor torque limit value LUTmg2 than the upshift second electric motor torque limitation map Lup and, in other words, a larger second electric motor torque Tmg2 is allowed.

The electric motor torque limit value reduction gradient in the conventional second electric motor torque limitation map Lcnv is empirically determined in advance such that, if the second electric motor rotation speed Nmg2 temporarily sharply rises at the time of upshift of the automatic transmission 22, the predetermined allowable voltage LVcon is not exceeded by the smoothing capacitor voltage Vcon increasing in conjunction with a decrease in the second electric motor torque Tmg2 due to the electric motor torque limitation control. However, if the second electric motor torque Tmg2 is set to the second electric motor torque limit value LUTmg2 and limited under a constant gradient of the electric motor torque limit value reduction gradient, in the rotation speed range from the conventional torque limitation start rotation speed NSmg2cnv to the second-electric-motor zero-torque rotation speed N1mg2 in the conventional second electric motor torque limitation map Lcnv, a temporal increase rate of the second electric motor rotation speed Nmg2, i.e., second electric motor rotation acceleration ANmg2 is maximized at a point PT01 having the largest second electric motor torque limit value LUTmg2 and, therefore, a slope (e,g., in W/sec) of an output reduction of the second electric motor MG2 relative to time, i.e., a second electric motor output reduction rate RPmg2 is maximized at the point PT01. In other words, the smoothing capacitor voltage Vcon becomes higher when the second electric motor output reduction rate RPmg2 is larger, and is maximized at the point PT01. Therefore, the electric motor torque limit value reduction gradient in the conventional second electric motor torque limitation map Lcnv is empirically determined in advance such that, when the second electric motor torque Tmg2 is the second-electric-motor allowable maximum torque Tmg2max and the second electric motor rotation speed Nmg2 is the conventional torque limitation start rotation speed NSmg2cnv, the allowable voltage LVcon is not exceeded by the smoothing capacitor voltage Vcon increasing in conjunction with a decrease in the second electric motor torque Tmg2 and such that the second electric motor torque Tmg2 is not excessively limited.

Figure 6:
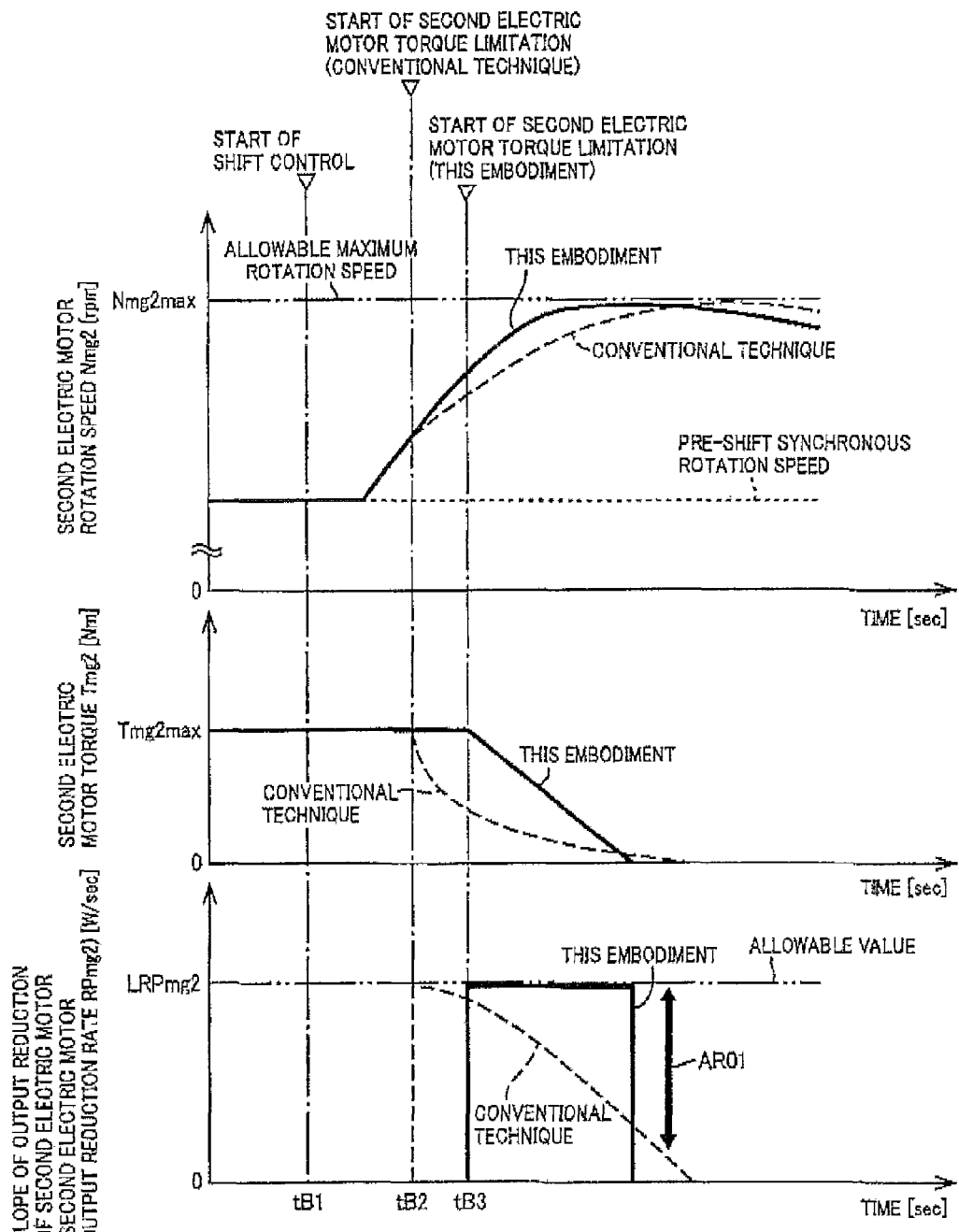
FIG. 6 is a time chart for explaining an electric motor torque limitation control provided by the electronic control device of FIG. 3 with the upshift second electric motor torque limitation map (a solid line Lup) of FIG. 5 while taking as an example the case that the second electric motor rotation speed temporarily sharply rises at the time of upshift of the automatic transmission higher than a rotation speed before the shift in an acceleration-on state in the vehicle drive device of FIG. 1.

FIG. 6 is a time chart for explaining the electric motor torque limitation control taking as an example the case that the second electric motor rotation speed Nmg2 temporarily sharply rises at the time of upshift of the automatic transmission 22 higher than a rotation speed before the shift (pre-shift synchronous rotation speed) in an acceleration-on state while the accelerator pedal 27 is depressed. Since the upshift of the automatic transmission 22 is started at time tB1, the upshift determining means 90 determines that the upshift control of the automatic transmission 22 is in operation and, in a time chart (solid line) of this embodiment of FIG. 6, the upshift second electric motor torque limitation map Lup of FIG. 5 is selected. For comparison with the time chart of this embodiment, a time chart (broken line) of the conventional technique is depicted in FIG. 6 and, in the time chart of the conventional technique, the second electric motor torque limit value LUTmg2 is determined based on the conventional second electric motor torque limitation map Lcnv of FIG. 5 to limit the second electric motor torque Tmg2. If the second electric motor rotation speed Nmg2 temporarily sharply rises at the time of upshift of the automatic transmission 22, the second electric motor rotation speed Nmg2 rapidly increases in most cases and, therefore, the second electric motor torque Tmg2 reaches the upper limit thereof i.e., the second electric motor torque limit value LUTmg2. Thus, with regard to the second electric motor torque Tmg2, as the rotation speed of the second electric motor MG2 increases, a relationship between the second electric motor rotation speed Nmg2 and the second electric motor torque Tmg2 in the time chart of the conventional technique of FIG. 6 changes along the broken line Lcnv as indicated by an arrow AR1cnv of FIG. 5 when the relationship is represented on the map of FIG. 5, and a relationship between the second electric motor rotation speed Nmg2 and the second electric motor torque Tmg2 in the time chart of this embodiment of FIG. 6 changes along the solid line Lup as indicated by an arrow AR1up of FIG. 5. Therefore, in the time chart of this embodiment of FIG. 6, if the second electric motor rotation speed Nmg2 temporarily sharply rises at the time of upshift of the automatic transmission 22 higher than a rotation speed before the shift, the second electric motor torque limiting means 92 provides the electric motor torque limitation control and, in the electric motor torque limitation control, the second electric motor torque limiting means 92 makes the second electric motor torque Tmg2 smaller as the second electric motor rotation speed Nmg2 becomes higher and makes a gradient of the output torque reduced amount of the second electric motor MG2 larger as the second electric motor rotation speed Nmg2 becomes higher in accordance with the upshift second electric motor torque limitation map Lup of FIG. 5. The gradient of the output torque reduced amount of the second electric motor MG2 is specifically a rate of the reduced amount of the second electric motor torque Tmg2 relative to the increased amount of the second electric motor rotation speed Nmg2.

Time tB2 of FIG. 6 indicates a time point when the increasing second electric motor rotation speed Nmg2 reaches the conventional torque limitation start rotation speed NSmg2cnv of FIG. 5 and, in the conventional technique (broken line of FIG. 6), the second electric motor torque limit value LUTmg2, i.e., the second electric motor torque Tmg2 equal to the limit value starts decreasing from time tB2. Time tB3 indicates a time point when the increasing second electric motor rotation speed Nmg2 (solid line of FIG. 6) reaches the upshift torque limitation start rotation speed NSmg2up of FIG. 5 and, in this embodiment (solid line of FIG. 6), the second electric motor torque Tmg2 starts decreasing from time tB3.

In this embodiment, as depicted in FIG. 5, the second-electric-motor zero torque rotation speed N1mg2 is set lower than the allowable maximum rotation speed Nmg2max of the second electric motor MG2 and, therefore, the second electric motor torque limiting means 92 sets the second electric motor torque Tmg2 to zero before the increasing second electric motor rotation speed Nmg2 reaches the allowable maximum rotation speed Nmg2max. In other words, in the electric motor torque limitation control, if the second electric motor rotation speed Nmg2 is equal to or greater than the predefined rotation speed N1mg2 equal to or less than the allowable maximum rotation speed Nmg2max, the second electric motor torque limiting means 92 sets the second electric motor torque Tmg2 to zero or less than zero. Therefore, the increasing second electric motor rotation speed Nmg2 turns to decline before reaching the allowable maximum rotation speed Nmg2max. In this embodiment, the higher rotation of the second electric motor MG2 is prevented in this way. Since the second-electric-motor zero-torque rotation speed N1mg2 is the same rotation speed in the conventional technique as depicted in. FIG. 5, the increasing second electric motor rotation speed Nmg2 turns to decline before reaching the allowable maximum rotation speed Nmg2max in the conventional technique (broken line) as depicted in FIG. 6 and the higher rotation of the second electric motor MG2 is prevented.

Since the second electric motor rotation speed Nmg2 very strongly correlates with the magnitude of the second electric motor torque Tmg2, the second electric motor rotation acceleration ANmg2 is larger when the second electric motor torque Tmg2 is larger. In the process of increase of the second electric motor rotation speed Nmg2 as indicated by the arrow AR1cnv of FIG. 5, the second electric motor rotation acceleration ANmg2 becomes smaller as the second electric motor torque Tmg2 is reduced. Therefore, as indicated by the broken line Lcnv of FIG. 5, if the electric motor torque limit value reduction gradient is a constant gradient in a range of reduction of the second electric motor torque Tmg2 set to the second electric motor torque limit value LUTmg2 or, specifically, in the rotation speed range from the conventional torque limitation start rotation speed NSmg2cnv to the second-electric-motor zero-torque rotation speed N1mg2, the second electric motor rotation acceleration ANmg2 is maximized at a point PT01 having the largest second electric motor torque Tmg2 and a reduced amount per unit time, i.e., a temporal reduction rate, of the second electric motor torque Tmg2 is maximized at the point PT01. Therefore, in the time chart of the conventional technique (broken line) of FIG. 6, in the process of limiting and reducing the second electric motor torque Tmg2, the temporal reduction rate of the second electric motor torque Tmg2 at time tB2 is the largest and the temporal reduction rate comes closer to zero over time from time tB2. In a time chart (broken line) of the second electric motor output reduction rate RPmg2 that is the slope (e.g., in W/sec) of an output reduction of the second electric motor MG2 relative to time, the second electric motor output reduction rate RPmg2 is maximized at time tB2 and decreases over time from time tB2. Therefore, in the time chart of the conventional technique (broken line), at time tB2, the second electric motor output reduction rate RPmg2 rises to a level slightly below an preliminarily empirically determined allowable value LRPmg2 (hereinafter referred to as a second electric motor output reduction rate allowable value LRPmg2) and, after time tB2, a margin of the second electric motor output reduction rate RPmg2 relative to the second electric motor output reduction rate allowable value LRPmg2 is expanded over time (see an arrow AR01 of FIG. 6). Therefore, in terms of the time chart (broken line) of the second electric motor output reduction rate RPmg2, the conventional technique has a room for alleviation of the limitation of the second electric motor torque Tmg2. The second electric motor output reduction rate allowable value LRPmg2 is an allowable value corresponding to the allowable voltage LVcon of the smoothing capacitor voltage Vcon and is empirically determined in advance to the second electric motor output reduction rate RPmg2 when the smoothing capacitor voltage Vcon is the allowable voltage LVcon under a certain condition.

On the other hand, in the time chart of this embodiment (solid line) of FIG. 6, the second electric motor torque Tmg2 set to the second electric motor torque limit value LUTmg2 starts decreasing from time tB3; however, the temporal reduction rate of the second electric motor torque Tmg2 does not come closer to zero over time from time tB3. This difference of change in the second electric motor torque Tmg2 from the conventional technique is generated because the electric motor torque limit value reduction gradient becomes larger when the second electric motor rotation speed Nmg2 is higher in the upshift second electric motor torque limitation map Lup of FIG. 5. Therefore, as depicted in the time chart (solid line) of the second electric motor output reduction rate RPmg2, the second electric motor output reduction rate RPmg2 is maintained at, for example, a level slightly below the second electric motor output reduction rate allowable value LRPmg2 between time tB3 and the time point when the second electric motor torque Tmg2 becomes zero. Therefore, a margin of the second electric motor output reduction rate RPmg2 relative to the second electric motor output reduction rate allowable value LRPmg2 is made smaller as compared to the conventional technique (broken line) in the process of reducing the second electric motor torque Tmg2. As described above, in this embodiment, a margin of the second electric motor output reduction rate RPmg2 relative to the second electric motor output reduction rate allowable value LRPmg2 is made smaller even after time tB3 when the second electric motor torque Tmg2 is caused to start decreasing, thereby reducing the second electric motor torque Tmg2 to zero in a shorter time as compared to the conventional technique, as can be seen from the fact that time tB3 is a time point later than time tB2. A rotation speed increase width from the upshift torque limitation start rotation speed NSmg2up to the second-electric-motor zero-torque rotation speed N1mg2 depicted in FIG. 5 can be made smaller than a rotation speed increase width from the conventional torque limitation start rotation speed NSmg2cnv to the second-electric-motor zero-torque rotation speed N1mg2 because, as depicted in the time chart of the second electric motor output reduction rate RPmg2 of FIG. 6, a margin of the second electric motor output reduction rate RPmg2 relative to the second electric motor output reduction rate allowable value LRPmg2 is smaller in this embodiment as compared to the conventional technique in the entire process of reducing the second electric motor torque Tmg2. As can be seen from the fact that the upshift torque limitation start rotation speed NSmg2up is higher than the conventional torque limitation start rotation speed NSmg2cnv in FIG. 5, if the electric motor torque limitation control is provided to suppress the second electric motor rotation speed Nmg2 to the allowable maximum rotation speed Nmg2max or less in this embodiment, the second electric motor rotation speed Nmg2 at the start of reduction of the second electric motor torque Tmg2, i.e., the torque limitation start rotation speed NSmg2up, can be set higher in the increasing process of the second electric motor rotation speed Nmg2 as compared to the conventional technique.

Figure 7:
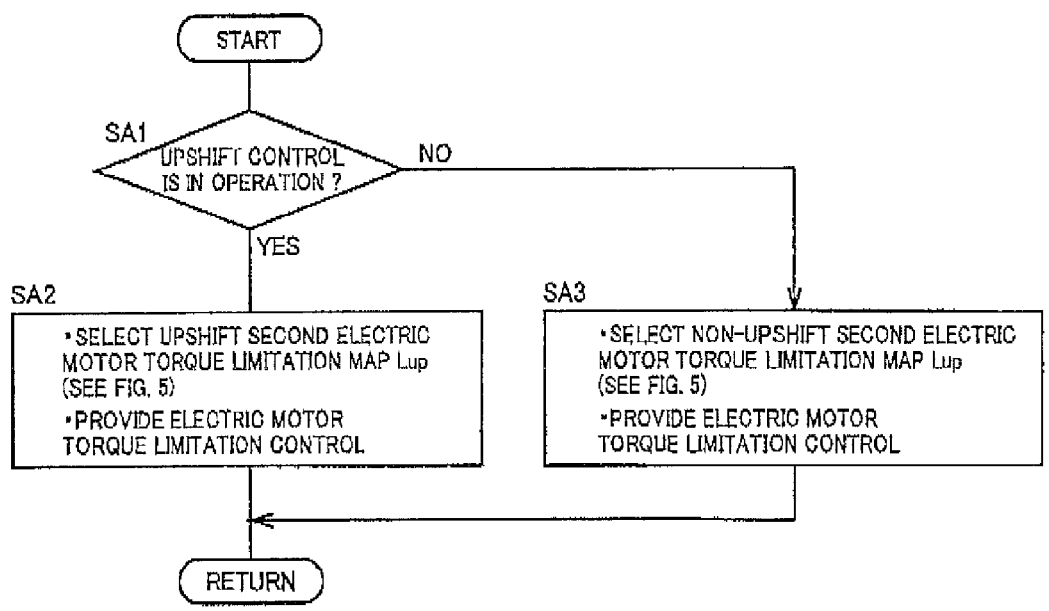
FIG. 7 is a flowchart in a first embodiment for explaining a main portion of the control operation of the electronic control device of FIG. 1, i.e., the control operation of limiting the second electric motor torque based on the second electric motor rotation speed.

FIG. 7 is a flowchart for explaining a main portion of the control operation of the electronic control device 28, i.e., the control operation of limiting the second electric motor torque Tmg2 based on the second electric motor rotation speed Nmg2 and is repeatedly executed with an extremely short cycle time, for example, on the order of few msec to a few tens of msec.

First, at step (hereinafter, "step" will be omitted) SA1 corresponding to the upshift determining means 90, it is determined whether the upshift control of the automatic transmission 22 is in operation. If the determination of SA1 is affirmative, i.e., if the upshift control of the automatic transmission 22 is in operation, the operation goes to SA2. On the other hand, if the determination of SA1 is negative, the operation goes to SA3. At SA1, in addition to determining whether the upshift control of the automatic transmission 22 is in operation, it may be determined whether the acceleration-on state is present, i.e., whether an acceleration operation is being performed for accelerating the vehicle 8. In this case, the determination of SA1 is affirmative if the upshift control of the automatic transmission 22 is in operation and the acceleration-on state is present.

At SA2 corresponding to the second electric motor torque limiting means 92, the upshift second electric motor torque limitation map Lup (see FIG. 5) is selected to limit the second electric motor torque Tmg2 with the electric motor torque limitation control. The electric motor torque limitation control is provided and, in the electric motor torque limitation control, the upshift second electric motor torque limitation map Lup is used for limiting the second electric motor torque Tmg2 based on the second electric motor rotation speed Nmg2.

At SA3 corresponding to the second electric motor torque limiting means 92, the non-upshift second electric motor torque limitation map Lnup (see FIG. 5) is selected to limit the second electric motor torque Tmg2 with the electric motor torque limitation control. The electric motor torque limitation control is provided and, in the electric motor torque limitation control, the non-upshift second electric motor torque limitation map Lnup is used for limiting the second electric motor torque Tmg2 based on the second electric motor rotation speed Nmg2.

This embodiment has the following effects (A1) to (A4). (A1) According to this embodiment, if the second electric motor rotation speed Nmg2 temporarily sharply rises at the time of upshift of the automatic transmission 22 higher than a rotation speed before the shift, the second electric motor torque limiting means 92 provides the electric motor torque limitation control and, in the electric motor torque limitation control, the second electric motor torque Tmg2 is made smaller when the second electric motor rotation speed Nmg2 is higher, and a rate of a reduced amount of the second electric motor torque Tmg2 relative to an increased amount of the second electric motor rotation speed Nmg2, i.e., a gradient of an output torque reduced amount of the second electric motor MG2, is made larger when the second electric motor rotation speed Nmg2 is higher, in accordance with the upshift second electric motor torque limitation map Lup of FIG. 5. Therefore, in the electric motor torque limitation control of this embodiment, the higher rotation of the second electric motor MG2 can be suppressed to the same allowable maximum rotation speed Nmg2max as the conventional technique of FIGS. 5 and 6. Concurrently, in the increasing process of the second electric motor rotation speed Nmg2 when the second electric motor rotation speed Nmg2 temporarily sharply rises, for example, as indicated by the arrow AR1up of FIG. 5, the second electric motor torque Tmg2 can be caused to start decreasing from the upshift torque limitation start rotation speed NSmg2up higher than the conventional torque limitation start rotation speed NSmg2cnv of the conventional technique. Therefore, this embodiment can suppress the higher rotation of the second electric motor MG2 equivalently to the conventional technique, can acquire the protection of the inverters 30 and 44 from temporary surplus power accumulated in the inverter smoothing capacitor 66 equivalently to the conventional technique, and can also alleviate the power performance deterioration of the vehicle 8 when the second electric motor torque Tmg2 is limited as compared to the conventional technique.

As can be seen from the comparison between the upshift second electric motor torque limitation map Lup and the conventional second electric motor torque limitation map Lcnv of FIG. 5, the larger second electric motor torque Tmg2 is allowed in the high rotation speed region of the second electric motor MG2 in this embodiment as compared to the conventional technique and, therefore, for example, as depicted in the shift diagram of FIG. 4, the upshift line $L_{UP}$ can be set on the higher vehicle speed side than the conventional technique. In other words, this embodiment has a higher degree of freedom of setting the upshift line $L_{UP}$ and therefore can achieve improvement in fuel efficiency.

If the upshift torque limitation start rotation speed NSmg2up is lowered and set at the conventional torque limitation start rotation speed NSmg2cnv in the upshift second electric motor torque limitation map Lup of FIG. 5, i.e., if the power performance deterioration of the vehicle 8 is made approximately equivalent to the conventional technique when the second electric motor torque Tmg2 is limited in the electric motor torque limitation control of this embodiment, the maximum value of the second electric motor output reduction rate RPmg2 during the electric motor torque limitation control, i.e., the maximum value of the temporary surplus power generated during the electric motor torque limitation control, can be made smaller than the conventional technique. Therefore, the inverter smoothing capacitor 66 with a smaller electrostatic capacity is employable and the inverter smoothing capacitor 66 can be reduced in size and cost.

(A2) According to this embodiment, if the second electric motor rotation speed Nmg2 is equal to or greater than the predefined rotation speed N1mg2 equal to or less than the allowable maximum rotation speed Nmg2max in the electric motor torque limitation control, the second electric motor torque limiting means 92 sets the second electric motor torque Tmg2 to zero or less than zero. Therefore, since the second electric motor rotation speed Nmg2 is reduced due to rotational resistance etc., of the second electric motor MG2 when the second electric motor torque Tmg2 is equal to or less than zero, the second electric motor rotation speed Nmg2 can be prevented from exceeding the allowable maximum rotation speed Nmg2max.

(A3) According to this embodiment, if the second electric motor rotation speed Nmg2 temporarily sharply rises at the time of upshift of the automatic transmission 22 higher than a rotation speed before the shift, the second electric motor torque limiting means 92 provides the electric motor torque limitation control limiting the second electric motor torque Tmg2 to the second electric motor torque limit value LUTmg2 or less. In the rotation speed range between the upshift torque limitation start rotation speed NSmg2up and the second-electric-motor zero-torque rotation speed N1mg2 of FIG. 5, the second electric motor torque limit value LUTmg2 determined from the upshift second electric motor torque limitation map Lup becomes smaller when the second electric motor rotation speed Nmg2 is higher, and the higher second electric motor rotation speed Nmg2 results in the larger electric motor torque limit value reduction gradient, which is a rate of the reduced amount of the second electric motor torque limit value LUTmg2 relative to the increased amount of the second electric motor rotation speed Nmg2 in the upshift second electric motor torque limitation map Lup. The electric motor torque limit value reduction gradient in the upshift second electric motor torque limitation map Lup is empirically determined in advance such that, if the second electric motor rotation speed Nmg2 temporarily sharply rises at the time of upshift of the automatic transmission 22, the predetermined allowable voltage LVcon is not exceeded by the smoothing capacitor voltage Vcon increasing in conjunction with a decrease in the second electric motor torque Tmg2 due to the electric motor torque limitation control. Therefore, if the second electric motor rotation speed Nmg2 temporarily sharply rises at the time of upshift of the automatic transmission 22, the higher rotation of the second electric motor MG2 can be suppressed while the smoothing capacitor voltage Vcon is prevented from exceeding the predetermined allowable voltage LVcon.

(A4) Focusing attention on the rotation speed range between the upshift torque limitation start rotation speed NSmg2up and the second-electric-motor zero-torque rotation speed N1mg2 of FIG. 5 in this embodiment, when compared at the same second electric motor rotation speed Nmg2 in FIG. 5, the second electric motor torque limit value LUTmg2 determined from the non-upshift second electric motor torque limitation map Lnup is larger than the second electric motor torque limit value LUTmg2 determined from the upshift second electric motor torque limitation map Lup. Therefore, when compared without changing the second electric motor rotation speed Nmg2, the second electric motor torque limiting means 92 allows a larger second electric motor torque Tmg2 during a non-upshift period of the automatic transmission 22 than the time of upshift of the automatic transmission 22. Although the second electric motor rotation speed Nmg2 may temporarily sharply rise, for example, at the time of slip of the drive wheels 18 in the actual vehicle 8, the sharp rise of the second electric motor rotation speed Nmg2 is not so rapid as at the time of upshift partially because the rotational resistance of the drive wheels 18 to a road surface is generated and the rotating members such as the drive wheels 18 are still coupled to the second electric motor MG2 at the time of the slip. Therefore, during the non-upshift period of the automatic transmission 22, while the higher rotation of the second electric motor MG2 is appropriately suppressed, the power performance deterioration of the vehicle 8 during limitation of the second electric motor torque Tmg2 can further be alleviated as compared to the time of upshift of the automatic transmission 22.

Other embodiments of the present invention will be described. In the following description of the embodiments, the mutually overlapping portions of the embodiments are denoted by the same reference numerals and will not be described.

Second Embodiment

Figure 8:
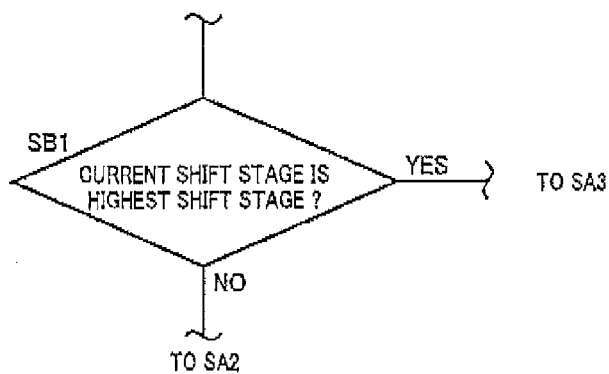
FIG. 8 is a flowchart of another second embodiment corresponding to FIG. 7 with SA1 of FIG. 7 replaced with another step i.e., SB1.

FIG. 8 is a flowchart of control operation of a second embodiment corresponding to FIG. 7 with SA1 of FIG. 7 replaced with another step and the step replacing SA1 of FIG. 7 is excerpted.

FIG. 8 depicts an example with SA1 replaced with SB1 in FIG. 7. In FIG. 8, first, the operation goes to SB1 corresponding to the upshift determining means 90. At SB1, it is determined whether the current shift stage of the automatic transmission 22 is the highest shift stage on the highest vehicle speed side, specifically, at the high-speed stage Hi. If the determination of SB1 is affirmative, i.e., if the current shift stage of the automatic transmission 22 is the highest shift stage, the operation goes to SA3. On the other hand, if the determination of SB1 is negative, the operation goes to SA2. The determination of SB1 is made in this way since an upshift is not performed if the current shift stage of the automatic transmission 22 is the highest shift stage.

Since SA1 is replaced with SB1 in this embodiment, an upshift determining means 102 of FIG. 3 determines whether the current shift stage of the automatic transmission 22 is the highest shift stage. The second electric motor torque limiting means 92 selects as the second electric motor torque limitation map the map indicated by the solid line Lup of FIG. 5 if the upshift determining means 102 determines that the current shift stage of the automatic transmission 22 is not the highest shift stage, or the map indicated by the dashed-two dotted line Lnup of FIG. 5 if the upshift determining means 102 determines that the current shift stage of the automatic transmission 22 is the highest shift stage. Therefore, in the view of the rotation speed range between the upshift torque limitation start rotation speed NSmg2up and the second-electric-motor zero-torque rotation speed N1mg2 of FIG. 5, when compared without changing the second electric motor rotation speed Nmg2, the second electric motor torque limiting means 92 allows a larger second electric motor torque Tmg2 in the case that the automatic transmission 22 is at the highest shift stage than the case of a shift stage of the automatic transmission 22 other than the highest shift stage.

This embodiment further has the following effects in addition to the effects (A1) to (A3) described in the first embodiment. According to this embodiment, in the rotation speed range between the upshift torque limitation start rotation speed NSmg2up and the second-electric-motor zero-torque rotation speed N1mg2 of FIG. 5, when compared without changing the second electric motor rotation speed Nmg2, the second electric motor torque limiting means 92 allows a larger second electric motor torque Tmg2 in the case that the automatic transmission 22 is at the highest shift stage than the case of a shift stage of the automatic transmission 22 other than the highest shift stage. An upshift of the automatic transmission 22 is not performed if the automatic transmission 22 is at the highest shift stage. Although the second electric motor rotation speed Nmg2 may temporarily sharply rise, for example, at the time of slip of the drive wheels 18 in the actual vehicle 8, the sharp rise of the second electric motor rotation speed Nmg2 is not so rapid as at the time of upshift partially because the rotational resistance of the drive wheels 18 to a road surface is generated and the rotating members, such as the drive wheels 18 are still coupled to the second electric motor MG2 at the time of the slip. Therefore, in the case that the automatic transmission 22 is at the highest shift stage, while the higher rotation of the second electric motor MG2 is appropriately suppressed, the power performance deterioration of the vehicle 8 during limitation of the second electric motor torque Tmg2 can further be alleviated as compared to the case that the automatic transmission 22 is not at the highest shift stage.

Although the embodiments of the present invention have been described in detail with reference to the drawings, these embodiments merely represent an embodiment and the present invention may be implemented in variously modified and improved forms based on the knowledge those skilled in the art.

For example, although the automatic transmission 22 is an automatic transmission capable of two-speed shifting in the first and second embodiments, the shift stages of the automatic transmission 22 are not limited to two-speed shifting and the automatic transmission 22 capable of switching three or more speeds may be available.

Although the horizontal axis of FIG. 5 indicates the second electric motor rotation speed Nmg2 in the first and second embodiments, if the second electric motor MG2 rotates in synchronization with another synchronous rotating member, the horizontal axis of FIG. 5 may indicate the rotation speed of the synchronous rotating member instead.

Although the flowchart of FIG. 7 has SA1 and SA3 in the first embodiment, SA1 and SA3 may not be included. In other words, the second electric motor torque limitation map may not be switched in the first embodiment and only the upshift second electric motor torque limitation map Lup of FIG. 5 may be used for providing the electric motor torque limitation control.

Figure 9:
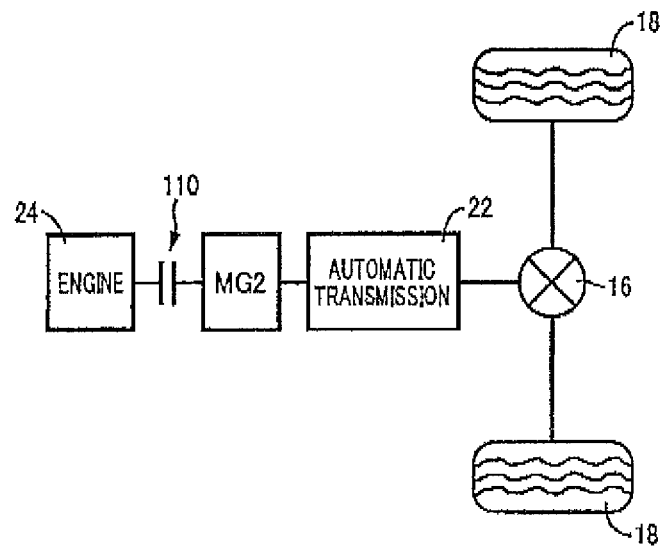
FIG. 9 is a diagram for explaining a general configuration of a parallel hybrid vehicle to which the present invention is applied and that has a different configuration from the hybrid vehicle depicted in FIG. 1.
Figure 10:
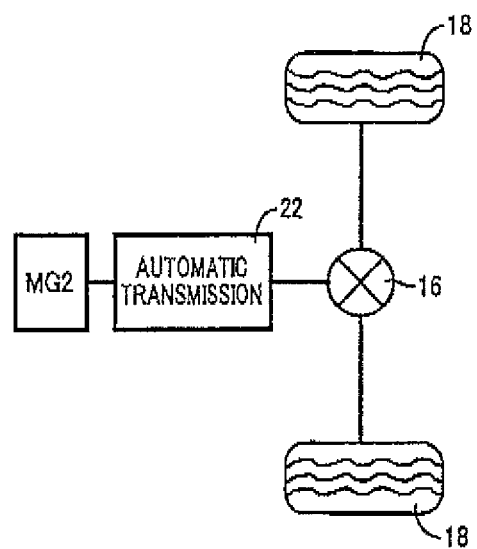
FIG. 10 is a diagram for explaining a general configuration of an electric vehicle to which the present invention is applied and that has a different configuration from the hybrid vehicle depicted in FIG. 1.

Although the drive device 10 includes the planetary gear device 26 and the first electric motor MG1 in the first and second embodiments, the drive device 10 may be a drive device for a so-called parallel hybrid vehicle having the engine 24, a clutch 110, the second electric motor MG2, the automatic transmission 22, and the drive wheels 18 coupled in series without including the first electric motor MG1 and the planetary gear device 26 as depicted in FIG. 9, for example. The clutch 110 between the engine 24 and the second electric motor MG2 is disposed as needed and it is conceivable that the drive device for the parallel hybrid vehicle is configured without the clutch 110. Furthermore, as depicted in FIG. 10, the drive device 10 may be a drive device of an electric vehicle without the engine 24 and the clutch 110 as compared to the parallel hybrid vehicle of FIG. 9, i.e., may be a drive device of an electric vehicle having the second electric motor MG2, the automatic transmission 22, and the drive wheels 18 coupled in series.

Although the ring gear R0 acting as the output element of the planetary gear device 26 is coupled to the output shaft 14 as depicted in FIG. 1 in the drive device 10 of the first and second embodiments, the ring gear R0 may be coupled to the sun gear S2 acting as the input element of the automatic transmission 22 instead of the output shaft 14. In other words, the planetary gear device 26, the second electric motor MG2, the automatic transmission 22, and the output shaft 14 may be coupled in this order from the engine side.

Figure 11:
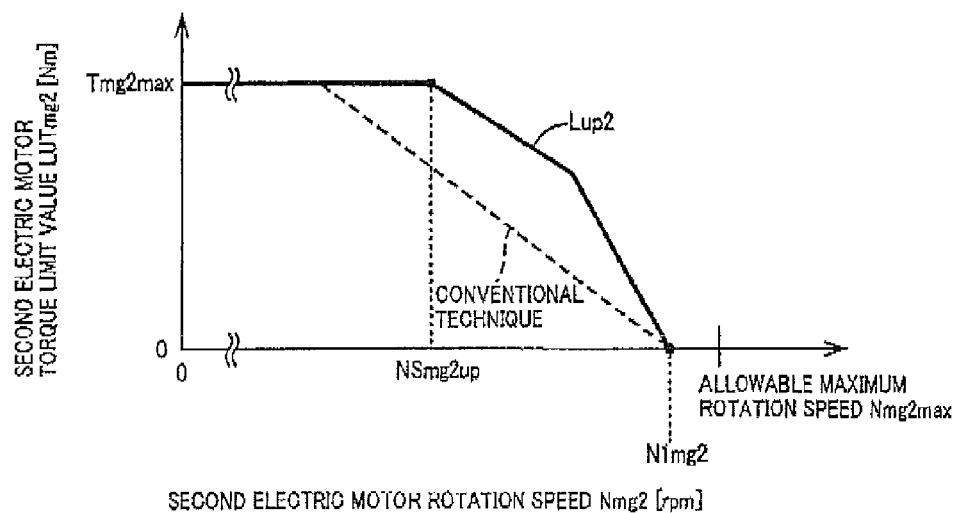
FIG. 11 is a diagram of an example of an electric motor torque limit value reduction gradient of the upshift second electric motor torque limitation map of FIG. 5 varying stepwise in two stages.

Although the electric motor torque limit value reduction gradient of the upshift second electric motor torque limitation map Lup (see FIG. 5) continuously varies in the process of increase of the second electric motor rotation speed Nmg2 from the upshift torque limitation start rotation speed NSmg2up to the second-electric-motor zero torque rotation speed N1mg2 in the first and second embodiments, the electric motor torque limit value reduction gradient may vary stepwise in two or three stages rather than continuously. An example of the electric motor torque limit value reduction gradient varying in two stages is represented by a solid line Lup2 of FIG. 11. In the non-upshift second electric motor torque limitation map Lnup, the electric motor torque limit value reduction gradient may also vary stepwise in two or three stages rather than continuously in the process of increase of the second electric motor rotation speed Nmg2 from the non-upshift torque limitation start rotation speed NSmg2nup to the second-electric-motor zero torque rotation speed N1mg2.

Figure 12:
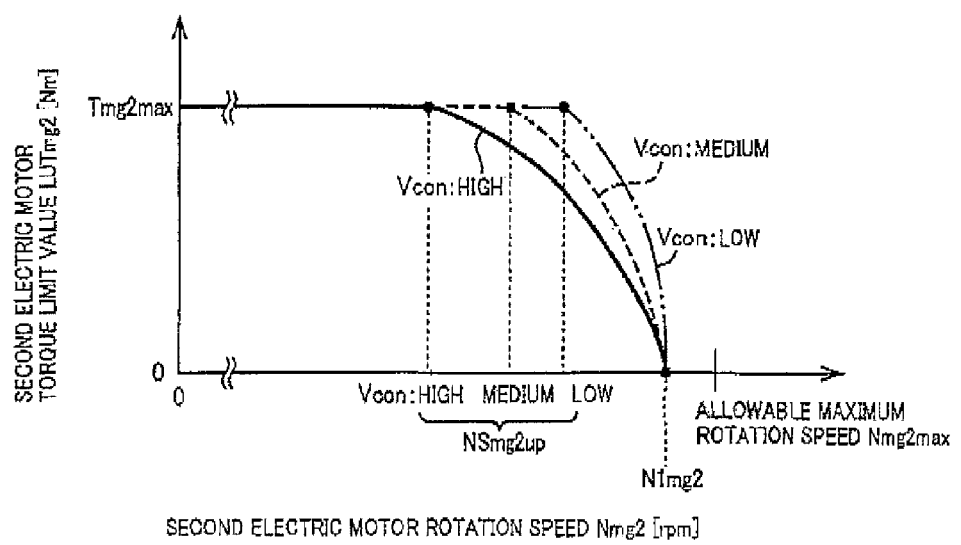
FIG. 12 is a diagram of an example of changing the upshift second electric motor torque limitation map of FIG. 5 depending on a smoothing capacitor voltage.

Although the upshift second electric motor torque limitation map Lop (see FIG. 5) is not changed depending on the smoothing capacitor voltage Vcon in the first and second embodiments, the upshift second electric motor torque limitation map Lup may be changed depending on the smoothing capacitor voltage Vcon. In such a case, the smoothing capacitor voltage Vcon is sequentially detected and, for example, as depicted in FIG. 12, the upshift second electric motor torque limitation map Lup has the upshift torque limitation start rotation speed NSmg2up set lower when the smoothing capacitor voltage Vcon is higher or when a capacitor electric charge accumulated in the inverter smoothing capacitor 66 is larger, and has the second electric motor torque limit value LUTmg2 set smaller in the high rotation speed region of the second electric motor MG2 when compared at the same second electric motor rotation speed Nmg2. As a result, as compared to the case that the upshift second electric motor torque limitation map Lup is not changed depending on the smoothing capacitor voltage Vcon, the second electric motor torque Tmg2 can more appropriately be limited. Although the upshift second electric motor torque limitation map Lup may be decided based on the smoothing capacitor voltage Vcon at any time point, for example, the upshift second electric motor torque limitation map Lup is decided based on the smoothing capacitor voltage Vcon at the start of upshift of the automatic transmission 22.

Although the automatic transmission 22 has the brakes B1 and B2 as the engagement elements engaged or released for performing a shift in the first and second embodiments, the engagement elements for performing a shift may be clutches.

Although each of the upshift second electric motor torque limitation map Lup and the non-upshift second electric motor torque limitation map Lnup of FIG. 5 is empirically determined in advance from the allowable maximum rotation speed Nmg2max of the second electric motor MG2, the second electric motor output reduction rate allowable value LRPmg2, an inertia of the second electric motor MG2 or an inertia of a rotating member rotating in synchronization with the second electric motor MG2, etc., and the second electric motor torque limit value LUTmg2 is determined from the second electric motor torque limitation map Lup or Lnup in the first and second embodiments, the second electric motor torque limit value LUTmg2 may sequentially be calculated based on at least one of a rotation speed of the second electric motor MG2 or a rotating member rotating in synchronization with the second electric motor MG2, the second electric motor torque Tmg2, and the second electric motor rotation acceleration ANmg2 by using, for example, an experimental equation obtained empirically in advance, instead of the second electric motor torque limitation map Lup or Lnup.

Although the drive device 10 includes the automatic transmission 22 in the first and second embodiments, the automatic transmission 22 may be replaced with a manual transmission in a conceivable configuration.

Although the electric motor torque limitation control is provided if the second electric motor rotation speed Nmg2 temporarily sharply rises at the time of upshift of the automatic transmission 22 higher than a rotation speed before the shift in the first and second embodiments, the sharp rise of the second electric motor rotation speed Nmg2 may not be temporary.

A plurality of the embodiments described above may be implemented in a mutually combined manner by setting priority, for example.

Although not exemplarily illustrated one by one, the present invention is implemented with various modifications applied without departing from the spirit thereof.

NOMENCLATURE OF ELEMENTS

10: drive device (vehicle drive device)
18: drive wheels
22: automatic transmission (transmission)
28: electronic control device (control device)
32: electric storage device (electric-motor power source)
44: second inverter (inverter)
66: inverter smoothing capacitor
MG2: second electric motor (electric motor)
B1: first brake (engagement element)
B2: second brake (engagement element)

The invention claimed is:

1. A control device of a vehicle drive device having an electric motor connected via an inverter to an electric-motor power source, an inverter smoothing capacitor connected to the inverter on the electric-motor power source side thereof, and a transmission making up a portion of a power transmission path between the electric motor and drive wheels,
the control device being configured to decrease an output torque of the electric motor as a rotation speed of the electric motor increases, and to increase a gradient of an output torque reduced amount of the electric motor as the rotation speed of the electric motor increases if the rotation speed of the electric motor rises at a time of upshift of the transmission to be higher than the rotation speed of the electric motor before the upshift.

2. The control device of claim 1, wherein
if the rotation speed of the electric motor rises at the time of upshift of the transmission to be higher than the rotation speed of the electric motor before the upshift, the control device sets the output torque of the electric motor to zero or less if the rotation speed of the electric motor is equal to or greater than a predefined rotation speed equal to or less than a predetermined allowable maximum rotation speed of the electric motor.

3. The control device of claim 1, wherein
if the rotation speed of the electric motor rises at the time of upshift of the transmission to he higher than the rotation speed of the electric motor before the upshift, the control device limits the output torque of the electric motor to an electric motor torque limit value or less, wherein the electric motor torque limit value decreases as the rotation speed of the electric motor increases, a rate of a reduced amount of the electric motor torque limit value relative to a rotation speed increased amount of the electric motor increases as the rotation speed of the electric motor is higher increases, and the electric motor torque limit value is determined such that a predetermined allowable voltage is not exceeded by a terminal voltage of the inverter smoothing capacitor increasing in conjunction with a decrease in the output torque of the electric motor if the rotation speed of the electric motor rises at the time of upshift of the transmission.

4. The control device of claim 1, wherein
if the transmission is at a highest shift stage of shift stages of the transmission corresponding to vehicle speeds, the control device allows an output torque of the electric motor to be larger than an output torque of the electric motor in a case of a shift stage of the transmission other than the highest shift stage for a same rotation speed of the electric motor.

* * * * *